(12) United States Patent
Tsuji

(10) Patent No.: US 9,749,500 B2
(45) Date of Patent: Aug. 29, 2017

(54) CHART CREATION METHOD, CONTROL APPARATUS AND NON-TRANSITORY COMPUTER-READABLE STORAGE MEDIUM STORING CHART CREATION CONTROL PROGRAM

(71) Applicant: Konica Minolta, Inc., Chiyoda-ku, Tokyo (JP)

(72) Inventor: Kosuke Tsuji, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/058,583

(22) Filed: Mar. 2, 2016

(65) Prior Publication Data

US 2016/0261773 A1 Sep. 8, 2016

(30) Foreign Application Priority Data

Mar. 3, 2015 (JP) .................. 2015-041076

(51) Int. Cl.
| | |
|---|---|
| *G06F 15/00* | (2006.01) |
| *H04N 1/60* | (2006.01) |
| *G06K 15/02* | (2006.01) |
| *H04N 1/00* | (2006.01) |

(52) U.S. Cl.
CPC ....... *H04N 1/6008* (2013.01); *G06K 15/1836* (2013.01); *G06K 15/1851* (2013.01); *H04N 1/00023* (2013.01); *H04N 1/00045* (2013.01); *H04N 1/00087* (2013.01); *H04N 1/00411* (2013.01); *H04N 1/00708* (2013.01); *H04N 1/6033* (2013.01); *H04N 1/6044* (2013.01); *H04N 2201/0094* (2013.01)

(58) Field of Classification Search
None
See application file for complete search history.

(56) References Cited

FOREIGN PATENT DOCUMENTS

| | | |
|---|---|---|
| JP | 2007-170883 | 7/2007 |
| JP | 2009213005 A | 9/2009 |
| JP | 2012196891 A * | 10/2012 |

OTHER PUBLICATIONS

Extended European Search Report dated Jul. 27, 2016, issued by the European Patent Office in corresponding European Application No. 16157996.6-1902 (8 pages).

* cited by examiner

*Primary Examiner* — Helen Q Zong
(74) *Attorney, Agent, or Firm* — Buchanan Ingersoll & Rooney PC

(57) ABSTRACT

A chart creation method to be used in a system including an image forming apparatus and a control apparatus, the control apparatus and a non-transitory computer-readable medium storing a chart creation control program are provided. The chart creation method includes: creating a print image of a chart; giving instructions to the image forming apparatus to print the chart and measure colors of the chart; obtaining measured color values of the color patches of the chart from the image forming apparatus; and rearranging the color patches of the chart so as to restrict spread of average color values of subgroups of color patches in the chart within a predetermined range. The chart creation method further includes: creating a print image of the color chart including the rearranged color patches, and giving instructions to the image forming apparatus to print the chart and measure colors of the chart.

21 Claims, 29 Drawing Sheets

FIG. 11

|     |    |     |     |
|-----|----|-----|-----|
| 234 | 31 | 212 | 46  |
| 213 | 97 | 250 | 126 |
| 127 | 95 | 101 | 182 |
| 162 | 34 | 226 | 94  |

|    | x1 | x2 | x3 | x4 | x5 | x6 | x7 | x8 |
|----|----|----|----|----|----|----|----|----|
| y1 | 11 | 21 | 31 | 41 | 51 | 61 | 71 | 81 |
| y2 | 12 | 22 | 32 | 42 | 52 | 62 | 72 | 82 |
| y3 | 13 | 23 | 33 | 43 | 53 | 63 | 73 | 83 |
| y4 | 14 | 24 | 34 | 44 | 54 | 64 | 74 | 84 |
| y5 | 15 | 25 | 35 | 45 | 55 | 65 | 75 | 85 |
| y6 | 16 | 26 | 36 | 46 | 56 | 66 | 76 | 86 |
| y7 | 17 | 27 | 37 | 47 | 57 | 67 | 77 | 87 |
| y8 | 18 | 28 | 38 | 48 | 58 | 68 | 78 | 88 |

|  | x1 | x2 | x3 | x4 | x5 | x6 | x7 | x8 |
|---|---|---|---|---|---|---|---|---|
| y1 | 11 | 21 | 31 | 41 | 51 | 61 | 71 | 81 |
| y2 | 12 | 22 | 32 | 42 | 52 | 62 | 72 | 82 |
| y3 | 13 | 23 | 33 | 43 | 53 | 63 | 73 | 83 |
| y4 | 14 | 24 | 34 | 44 | 54 | 64 | 74 | 84 |
| y5 | 15 | 25 | 35 | 45 | 55 | 65 | 75 | 85 |
| y6 | 16 | 26 | 36 | 46 | 56 | 66 | 76 | 86 |
| y7 | 17 | 27 | 37 | 47 | 57 | 67 | 77 | 87 |
| y8 | 18 | 28 | 38 | 48 | 58 | 68 | 78 | 88 |

FIG. 14A

|  | x1 | x2 | x3 | x4 | x5 | x6 | x7 | x8 |
|---|---|---|---|---|---|---|---|---|
| y1 | 11 | 21 | 31 | 41 | 51 | 61 | 71 | 81 |
| y2 | 12 | 22 | 32 | 42 | 52 | 62 | 72 | 82 |
| y3 | 13 | 23 | 33 | 43 | 53 | 63 | 73 | 83 |
| y4 | 14 | 24 | 34 | 44 | 54 | 64 | 74 | 84 |
| y5 | 15 | 25 | 35 | 45 | 55 | 65 | 75 | 85 |
| y6 | 16 | 26 | 36 | 46 | 56 | 66 | 76 | 86 |
| y7 | 17 | 27 | 37 | 47 | 57 | 67 | 77 | 87 |
| y8 | 18 | 28 | 38 | 48 | 58 | 68 | 78 | 88 |

FIG. 14B

|     | x1 | x2 | x3 | x4 | x5 | x6 | x7 | x8 |
|-----|----|----|----|----|----|----|----|----|
| y1  | 11 | 21 | 31 | 41 | 51 | 61 | 71 | 81 |
| y2  | 12 | 22 | 32 | 42 | 52 | 62 | 72 | 82 |
| y3  | 13 | 23 | 33 | 43 | 53 | 63 | 73 | 83 |
| y4  | 14 | 24 | 34 | 44 | 54 | 64 | 74 | 84 |
| y5  | 15 | 25 | 35 | 45 | 55 | 65 | 75 | 85 |
| y6  | 16 | 26 | 36 | 46 | 56 | 66 | 76 | 86 |
| y7  | 17 | 27 | 37 | 47 | 57 | 67 | 77 | 87 |
| y8  | 18 | 28 | 38 | 48 | 58 | 68 | 78 | 88 |

FIG. 14C

|     | x1 | x2 | x3 | x4 | x5 | x6 | x7 | x8 |
|-----|----|----|----|----|----|----|----|----|
| y1  | 11 | 21 | 31 | 41 | 51 | 61 | 71 | 81 |
| y2  | 12 | 22 | 32 | 42 | 52 | 62 | 72 | 82 |
| y3  | 13 | 23 | 33 | 43 | 53 | 63 | 73 | 83 |
| y4  | 14 | 24 | 34 | 44 | 54 | 64 | 74 | 84 |
| y5  | 15 | 25 | 35 | 45 | 55 | 65 | 75 | 85 |
| y6  | 16 | 26 | 36 | 46 | 56 | 66 | 76 | 86 |
| y7  | 17 | 27 | 37 | 47 | 57 | 67 | 77 | 87 |
| y8  | 18 | 28 | 38 | 48 | 58 | 68 | 78 | 88 |

FIG. 15A

|    | x1 | x2 | x3 | x4 | x5 | x6 | x7 | x8 | x9 |
|----|----|----|----|----|----|----|----|----|----|
| y1 | 11 | 21 | 31 | 41 | 51 | 61 | 71 | 81 | 91 |
| y2 | 12 | 22 | 32 | 42 | 52 | 62 | 72 | 82 | 92 |
| y3 | 13 | 23 | 33 | 43 | 53 | 63 | 73 | 83 | 93 |
| y4 | 14 | 24 | 34 | 44 | 54 | 64 | 74 | 84 | 94 |
| y5 | 15 | 25 | 35 | 45 | 55 | 65 | 75 | 85 | 95 |
| y6 | 16 | 26 | 36 | 46 | 56 | 66 | 76 | 86 | 96 |
| y7 | 17 | 27 | 37 | 47 | 57 | 67 | 77 | 87 | 97 |
| y8 | 18 | 28 | 38 | 48 | 58 | 68 | 78 | 88 | 98 |
| y9 | 19 | 29 | 39 | 49 | 59 | 69 | 79 | 89 | 99 |

FIG. 15B

|    | x1 | x2 | x3 | x4 | x5 | x6 | x7 | x8 | x9 |
|----|----|----|----|----|----|----|----|----|----|
| y1 | 11 | 21 | 31 | 41 | 51 | 61 | 71 | 81 | 91 |
| y2 | 12 | 22 | 32 | 42 | 52 | 62 | 72 | 82 | 92 |
| y3 | 13 | 23 | 33 | 43 | 53 | 63 | 73 | 83 | 93 |
| y4 | 14 | 24 | 34 | 44 | 54 | 64 | 74 | 84 | 94 |
| y5 | 15 | 25 | 35 | 45 | 55 | 65 | 75 | 85 | 95 |
| y6 | 16 | 26 | 36 | 46 | 56 | 66 | 76 | 86 | 96 |
| y7 | 17 | 27 | 37 | 47 | 57 | 67 | 77 | 87 | 97 |
| y8 | 18 | 28 | 38 | 48 | 58 | 68 | 78 | 88 | 98 |
| y9 | 19 | 29 | 39 | 49 | 59 | 69 | 79 | 89 | 99 |

FIG. 15C

|    | x1 | x2 | x3 | x4 | x5 | x6 | x7 | x8 | x9 |
|----|----|----|----|----|----|----|----|----|----|
| y1 | 11 | 21 | 31 | 41 | 51 | 61 | 71 | 81 | 91 |
| y2 | 12 | 22 | 32 | 42 | 52 | 62 | 72 | 82 | 92 |
| y3 | 13 | 23 | 33 | 43 | 53 | 63 | 73 | 83 | 93 |
| y4 | 14 | 24 | 34 | 44 | 54 | 64 | 74 | 84 | 94 |
| y5 | 15 | 25 | 35 | 45 | 55 | 65 | 75 | 85 | 95 |
| y6 | 16 | 26 | 36 | 46 | 56 | 66 | 76 | 86 | 96 |
| y7 | 17 | 27 | 37 | 47 | 57 | 67 | 77 | 87 | 97 |
| y8 | 18 | 28 | 38 | 48 | 58 | 68 | 78 | 88 | 98 |
| y9 | 19 | 29 | 39 | 49 | 59 | 69 | 79 | 89 | 99 |

|    | x1 | x2 | x3 | x4 | x5 | x6 | x7 | x8 |
|----|----|----|----|----|----|----|----|----|
| y1 | 11 | 21 | 31 | 41 | 51 | 61 | 71 | 81 |
| y2 | 12 | 22 | 32 | 42 | 52 | 62 | 72 | 82 |
| y3 | 13 | 23 | 33 | 43 | 53 | 63 | 73 | 83 |
| y4 | 14 | 24 | 34 | 44 | 54 | 64 | 74 | 84 |
| y5 | 15 | 25 | 35 | 45 | 55 | 65 | 75 | 85 |
| y6 | 16 | 26 | 36 | 46 | 56 | 66 | 76 | 86 |
| y7 | 17 | 27 | 37 | 47 | 57 | 67 | 77 | 87 |
| y8 | 18 | 28 | 38 | 48 | 58 | 68 | 78 | 88 |

|     | x1 | x2 | x3 | x4 | x5 | x6 | x7 | x8 |
|-----|----|----|----|----|----|----|----|----|
| y1  | 11 | 21 | 31 | 41 | 51 | 61 | 71 | 81 |
| y2  | 12 | 22 | 32 | 42 | 52 | 62 | 72 | 82 |
| y3  | 13 | 23 | 33 | 43 | 53 | 63 | 73 | 83 |
| y4  | 14 | 24 | 34 | 44 | 54 | 64 | 74 | 84 |
| y5  | 15 | 25 | 35 | 45 | 55 | 65 | 75 | 85 |
| y6  | 16 | 26 | 36 | 46 | 56 | 66 | 76 | 86 |
| y7  | 17 | 27 | 37 | 47 | 57 | 67 | 77 | 87 |
| y8  | 18 | 28 | 38 | 48 | 58 | 68 | 78 | 88 |

FIG. 16C

|     | x1 | x2 | x3 | x4 | x5 | x6 | x7 | x8 |
|-----|----|----|----|----|----|----|----|----|
| y1  | 11 | 21 | 31 | 41 | 51 | 61 | 71 | 81 |
| y2  | 12 | 22 | 32 | 42 | 52 | 62 | 72 | 82 |
| y3  | 13 | 23 | 33 | 43 | 53 | 63 | 73 | 83 |
| y4  | 14 | 24 | 34 | 44 | 54 | 64 | 74 | 84 |
| y5  | 15 | 25 | 35 | 45 | 55 | 65 | 75 | 85 |
| y6  | 16 | 26 | 36 | 46 | 56 | 66 | 76 | 86 |
| y7  | 17 | 27 | 37 | 47 | 57 | 67 | 77 | 87 |
| y8  | 18 | 28 | 38 | 48 | 58 | 68 | 78 | 88 |

FIG. 17A

|     | x1 | x2 | x3 | x4 | x5 | x6 | x7 | x8 |
|-----|----|----|----|----|----|----|----|----|
| y1  | 11 | 21 | 31 | 41 | 51 | 61 | 71 | 81 |
| y2  | 12 | 22 | 32 | 42 | 52 | 62 | 72 | 82 |
| y3  | 13 | 23 | 33 | 43 | 53 | 63 | 73 | 83 |
| y4  | 14 | 24 | 34 | 44 | 54 | 64 | 74 | 84 |
| y5  | 15 | 25 | 35 | 45 | 55 | 65 | 75 | 85 |
| y6  | 16 | 26 | 36 | 46 | 56 | 66 | 76 | 86 |
| y7  | 17 | 27 | 37 | 47 | 57 | 67 | 77 | 87 |
| y8  | 18 | 28 | 38 | 48 | 58 | 68 | 78 | 88 |

FIG. 17B

|     | x1 | x2 | x3 | x4 | x5 | x6 | x7 | x8 |
|-----|----|----|----|----|----|----|----|----|
| y1  | 11 | 21 | 31 | 41 | 51 | 61 | 71 | 81 |
| y2  | 12 | 22 | 32 | 42 | 52 | 62 | 72 | 82 |
| y3  | 13 | 23 | 33 | 43 | 53 | 63 | 73 | 83 |
| y4  | 14 | 24 | 34 | 44 | 54 | 64 | 74 | 84 |
| y5  | 15 | 25 | 35 | 45 | 55 | 65 | 75 | 85 |
| y6  | 16 | 26 | 36 | 46 | 56 | 66 | 76 | 86 |
| y7  | 17 | 27 | 37 | 47 | 57 | 67 | 77 | 87 |
| y8  | 18 | 28 | 38 | 48 | 58 | 68 | 78 | 88 |

FIG. 17C

|    | x1 | x2 | x3 | x4 | x5 | x6 | x7 | x8 |
|----|----|----|----|----|----|----|----|----|
| y1 | 11 | 21 | 31 | 41 | 51 | 61 | 71 | 81 |
| y2 | 12 | 22 | 32 | 42 | 52 | 62 | 72 | 82 |
| y3 | 13 | 23 | 33 | 43 | 53 | 63 | 73 | 83 |
| y4 | 14 | 24 | 34 | 44 | 54 | 64 | 74 | 84 |
| y5 | 15 | 25 | 35 | 45 | 55 | 65 | 75 | 85 |
| y6 | 16 | 26 | 36 | 46 | 56 | 66 | 76 | 86 |
| y7 | 17 | 27 | 37 | 47 | 57 | 67 | 77 | 87 |
| y8 | 18 | 28 | 38 | 48 | 58 | 68 | 78 | 88 |

|    | x1 | x2 | x3 | x4 | x5 | x6 |
|----|----|----|----|----|----|----|
| y1 | 11 | 21 | 31 | 41 | 51 | 61 |
| y2 | 12 | 22 | 32 | 42 | 52 | 62 |
| y3 | 13 | 23 | 33 | 43 | 53 | 63 |
| y4 | 14 | 24 | 34 | 44 | 54 | 64 |
| y5 | 15 | 25 | 35 | 45 | 55 | 65 |
| y6 | 16 | 26 | 36 | 46 | 56 | 66 |

FIG. 27B

|    | x1 | x2 | x3 | x4 | x5 | x6 |
|----|----|----|----|----|----|----|
| y1 | 11 | 21 | 31 | 41 | 51 | 61 |
| y2 | 12 | 22 | 32 | 42 | 52 | 62 |
| y3 | 13 | 23 | 33 | 43 | 53 | 63 |
| y4 | 14 | 24 | 34 | 44 | 54 | 64 |
| y5 | 15 | 25 | 35 | 45 | 55 | 65 |
| y6 | 16 | 26 | 36 | 46 | 56 | 66 |

CHART CREATION METHOD, CONTROL APPARATUS AND NON-TRANSITORY COMPUTER-READABLE STORAGE MEDIUM STORING CHART CREATION CONTROL PROGRAM

The entire disclosure of Japanese Patent Application No. 2015-041076 filed on Mar. 3, 2015 including description, claims, drawings, and abstract are incorporated herein by reference in its entirety.

TECHNICAL FIELD

The present invention relates to a chart creation method, a control apparatus and a non-transitory computer-readable storage medium storing a chart creation control program. In particular, the present invention relates to a non-transitory computer-readable storage medium storing a chart creation control program for controlling creation of a chart to be used for color calibration of an image forming apparatus; a control apparatus which creates the chart; and a chart creation method to be used in a system including the image forming apparatus and the control apparatus.

BACKGROUND

In color printing by using an image forming apparatus, such as a copying machine and a multi-functional peripheral (MFP), equipped with a color printing function, color management is one of keys to accurate reproduction of colors used in each page of a print job. In conventional color printing, color calibration includes measuring colors of a chart in which patches in CMYK colors are arranged, with a scanner or an in-line sensor disposed in an image forming apparatus; comparing color information of the color patches with the color information read with the scanner or in-line sensor to obtain the amount of color change; and performing feedback so as to put the amount of color change within a proper range.

DESCRIPTION OF THE RELATED ART

In order to perform accurate color calibration, it is necessary to measure with a scanner or an in-line sensor, only light rays reflected on each color patch to be measured. However, in actual measurement, a scanner or an in-line sensor can receive a mixture of color information of light rays reflected on a color patch to be measured (target color patch) and color information of light rays reflected on neighboring color patches of the target color patch via diffuse (or irregular) reflection. As a result, a change only in color of the neighboring color patches of the target color patch, can make a change of the obtained color information. Namely, a different patch arrangement in the chart can make the color measurement result different, even if the target color patch in the same color is measured.

As a method of reducing the influence of such diffuse reflection, a method may be considered so as to dispose a mechanism which blocks off light rays reflected on surroundings of the target color patch via diffuse reflection. However, this method increases a cost due to the addition of the mechanism and an increase of the number of structural components. In particular, in a system such that colors of a chart are measured with an in-line sensor disposed on the inside of an image forming apparatus, it is difficult to dispose a special mechanism in the in-line sensor. Accordingly, an increase of a cost due to the addition of the mechanism and an increase of the number of structural components becomes a large problem.

Further, with regard to a technique to suppress diffuse reflection on surroundings of a target color patch, for example, Japanese Unexamined Patent Publication (JP-A) No. 2007-170883 discloses a test chart on which multiple color regions are arrayed in a given direction. Specifically, the test chart shows a first image region including an array of the color regions, a second image region including another array of the color regions, and a black image region arranged between the first image region and the second image region. Among colors classified based on a constitution of color components, the colors of the color regions of the first image region belong to a first color group and the colors of the color regions of the second color image region belong to a second color group.

JP-A No. 2007-170883 discloses a method employing disposing a black image region between image regions each including color regions in colors of a different color group (i.e., between an aggregate of multiple color regions and its neighboring aggregate of multiple color regions). However, according to this method, the black image region arranged between image regions can reduce the number of patches capable of being arranged on a single sheet of a chart. It can increase the number of chart sheets and an excessive use of consumption materials, and further increase measurement time of the chart sheets, which are problems.

SUMMARY

Aspects of the present invention are directed to chart creation methods, control apparatuses and non-transitory computer-readable storage media each storing a chart creation control program.

A chart creation method reflecting one aspect of the present invention is a chart creation method to be used in a system including an image forming apparatus and a control apparatus which controls the image forming apparatus, where the image forming apparatus includes a print section and a color measurement section. The method comprises first creating a chart, which includes, creating, by the control apparatus, a print image of a chart in which a plurality of color patches are arranged; giving, from the control apparatus, instructions to the image forming apparatus to print the chart and measure colors of the chart; and printing the chart and measuring colors of the chart by the image forming apparatus. The method further comprises: performing rearrangement of the plurality of color patches of the chart by the control apparatus. The rearrangement includes obtaining measured color values of the plurality of color patches of the chart from the image forming apparatus. The rearrangement further includes rearranging the plurality of color patches of the chart so as to restrict spread of average color values calculated for subgroups of color patches in the chart within a predetermined range, where the subgroups each consists of one color patch and at least one neighboring color patch of the one color patch out of the plurality of color patches of the chart, and the average color values each is an average of measured color values of color patches forming one of the subgroups. The method further comprises: second creating a chart with the rearranged color patches, which includes creating, by the control apparatus, a print image of a chart including the rearranged color patches; giving, from the control apparatus, instructions to the image forming apparatus to print the chart including the rearranged color patches and measure colors of the chart; and printing the chart including the rearranged color patches and measuring colors of the chart by the image forming apparatus.

A control apparatus reflecting one aspect of the present invention is a control apparatus which controls an image forming apparatus including a print section and a color measurement section. The control apparatus comprises: a RIP (raster image processing) section that creates a print image of a chart in which a plurality of color patches are arranged; and an image data processing section. The image data processing section gives instructions to the image forming apparatus to print the chart and measure colors of the chart, on a basis of the print image created by the RIP section, and obtains measured color values of the plurality of color patches of the chart from the image forming apparatus. The image data processing section rearranges the plurality of color patches of the chart so as to restrict spread of average color values calculated for subgroups of color patches in the chart within a predetermined range, where the subgroups each consists of one color patch and at least one neighboring color patch of the one color patch out of the plurality of color patches of the chart, and the average color values each is an average of measured color values of color patches forming one of the subgroups.

A non-transitory computer-readable storage medium reflecting one aspect of the present invention stores a chart creation control program to be executed in a control apparatus which controls an image forming apparatus. The image forming apparatus includes a print section and a color measurement section. The chart creation control program, when being executed by a processor of the control apparatus, causes the control apparatus to perform the following processing. The processing comprises first creating a chart, including creating a print image of a chart in which a plurality of color patches are arranged; and giving instructions to the image forming apparatus to print the chart and measure colors of the chart. The processing further comprises performing rearrangement of the plurality of color patches of the chart. The rearrangement includes obtaining measured color values of the plurality of color patches of the chart from the image forming apparatus. The rearrangement further includes rearranging the plurality of color patches of the chart so as to restrict spread of average color values calculated for subgroups of color patches in the chart within a predetermined range, where the subgroups each consists of one color patch and at least one neighboring color patch of the one color patch out of the plurality of color patches of the chart, and the average color values each is an average of measured color values of color patches forming one of the subgroups. The processing further comprises second creating a chart with the rearranged color patches, includes creating a print image of a chart including the rearranged color patches; and giving instructions to the image forming apparatus to print the chart including the rearranged color patches and measure colors of the chart.

Other features of illustrative embodiments will be described below.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein:

FIG. 11 illustrates an example of RGB values of color patches of a chart pertaining to Example 1;

FIG. 12 is a diagram illustrating a relationship among a color patch, neighboring color patches, and a subgroup of color patches in a chart pertaining to Example 1;

FIGS. 13A, 13B and 13C are diagrams illustrating an example of calculation of average RGB values pertaining to Example 1;

FIGS. 14A, 14B and 14C are diagrams illustrating another example of calculation of average RGB values pertaining to Example 1;

FIGS. 15A, 15B and 15C are diagrams illustrating another example of calculation of average RGB values pertaining to Example 1;

FIGS. 16A, 16B and 16C are diagrams illustrating another example of calculation of average RGB values pertaining to Example 1;

FIGS. 17A, 17B and 17C are diagrams illustrating another example of calculation of average RGB values pertaining to Example 1;

FIGS. 27A, 27B and 27C are diagrams illustrating an example of calculation of average RGB values pertaining to Example 5.

DESCRIPTION OF THE PREFERRED EMBODIMENTS

Figure 1:
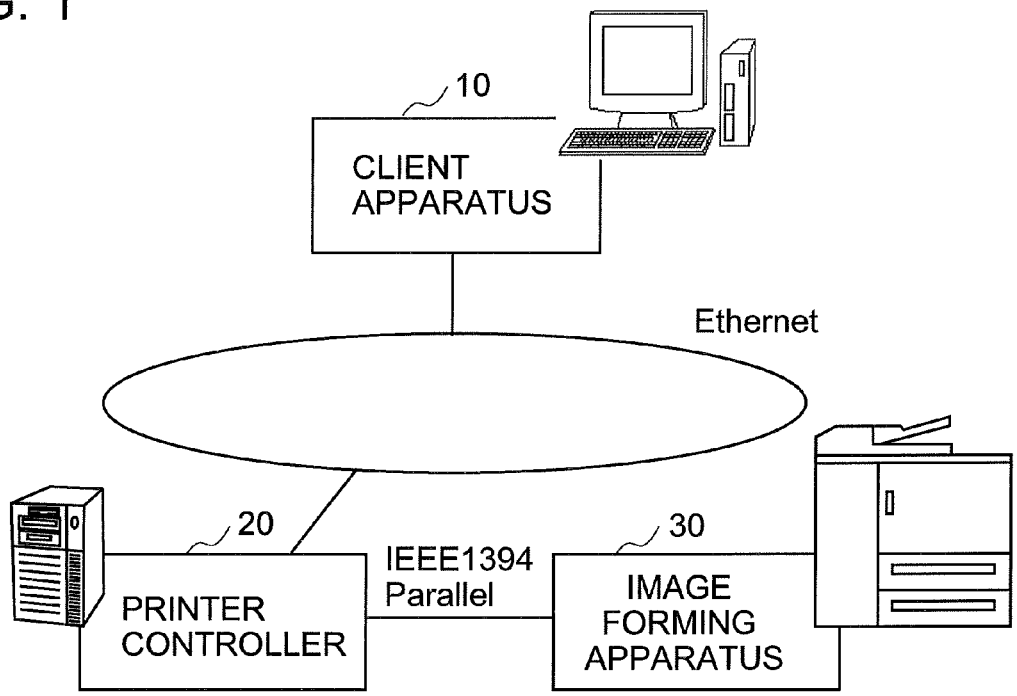
FIG. 1 is a schematic diagram illustrating an example of the constitution of a printing system pertaining to Example 1.

Hereinafter, an embodiment of the present invention will be described with reference to the drawings. However, the scope of the invention is not limited to the illustrated examples.

Chart creation methods, control apparatuses and non-transitory computer-readable storage media each storing a chart creation control program as embodiments of the present invention, can effectively restrict a change of measurement values of a chart coming from light reflected on neighboring color patches of a target color patch via diffuse reflection without increasing the number of chart sheets.

The reason is that a control apparatus (when executing a chart creation control program) causes an image forming apparatus to print a chart and measure colors of the chart, and performs rearrangement of the plurality of color patches of the chart in the following ways. That is, the rearrangement includes obtaining measured color values of the plurality of color patches of the chart from the image forming apparatus, and rearranging the plurality of color patches of the chart so as to restrict spread of average color values calculated for subgroups of color patches all over the chart within a predetermined range, where the subgroup of color patches represents a color patch group consisting of a target color patch and at least one neighboring color patch of the target color patch out of the plurality of color patches of the chart, and the average color value is an average of measured color values of color patches forming the subgroup. For example, the control apparatus selects a first patch and a second patch from the plurality of color patches of the chart, and selects one color patch as an exchange patch from a subgroup of color patches consisting of the first patch and at least one neighboring color patch of the first patch out of the plurality of color patches of the chart. The control apparatus exchanges the measured color values between the exchange patch and the second patch, and calculates average RGB values for plural subgroups of color patches including the exchange patch and the average RGB values for plural subgroups of color patches including the second patch, where the average RGB value is an average of measured RGB values of color patches forming a subgroup of color patches. Then, while successively selecting color patches as exchange patches from the subgroup of color patches including the first patch, the control apparatus finds a pair of color patches (an exchange patch and the first color patch) which minimizes spread of the average color values calculated for the subgroups of color patches all over the chart. The control apparatus then exchanges positions between the pair of color patches. The control apparatus repeats such exchange of the color patches until the spread of the average color values converges to a certain extent.

As described in BACKGROUND, in order to perform accurate color calibration by measuring colors of patches of a chart, it is necessary to measure, with color measurement instrument, only light rays reflected on a color patch to be measured (a target color patch). However, in actual measurement, the color measurement instrument can measure light rays reflected on neighboring color patches of the target color patch via diffuse reflection, which makes accurate color measurement difficult and further makes accurate color calibration difficult. As a method of reducing the influence of such diffuse reflection, Japanese Unexamined Patent Publication No. 2007-170883 proposes a method of disposing a black image region between image regions each including an array of color regions. However, in this method, disposing the black image region can reduce the number of patches which can be arranged in a single sheet of a chart and increase the number of chart sheets.

In view of that, a chart creation method as one embodiment of the present invention, performs, by a control apparatus, rearrangement of color patches of a chart so as to make the influence of diffuse reflection on surroundings of each target patch uniform throughout the chart, rather than adding a region to restrict diffuse reflection between arrays of color patches. That is, a control apparatus for controlling an image forming apparatus, creates a print image of a chart in which a plurality of color patches are arranged, and gives instructions to the image forming apparatus to print the chart and measure colors of the chart. The control apparatus obtains measured color values of the plurality of color patches of the chart from the image forming apparatus, and rearranges the plurality of color patches of the chart as follows. The control apparatus selects a color patch and at least one neighboring color patch from the chart to define a subgroup of color patches, and calculates an average color value (average RGB value) which is an average of measured color values (RGB values) of color patches forming the subgroup of color patches. The control apparatus calculates the average color values for subgroups of color patches all over the chart and rearranges color patches of the chart so as to restrict spread of the average color values within a predetermined range. The control apparatus further creates a print image of a chart including the rearranged color patches, and gives instructions to the image forming apparatus to print the chart including the rearranged color patches and measure colors of the chart.

In concrete terms, in the rearrangement of the color patches, the control apparatus performs the following processes. First, the control apparatus selects a first patch and a second patch from the color patches of the chart, and successively selects color patches as exchange patches from a subgroup of color patches consisting of the first patch and at least one neighboring color patch of the first patch. For each of the exchange patches, the control apparatus exchanges the measured RGB values between the exchange patch and the second patch, calculates the average RGB values for first subgroups including the exchange patch and the average RGB values for second subgroups including the second patch, and calculates an index indicating spread of the average RGB values calculated for the subgroups. On the basis of the calculated indexes, the control apparatus defines a pair of color patches to be exchanged, and exchanges positions between the pair of color patches. The control apparatus repeats the exchange of positions between the pair of color patches, while selecting the first patch and the second patch at random or in order.

The control apparatus may repeat the rearrangement of the color patches until a standard deviation of the average color values calculated for the subgroups all over the chart becomes equal to or less than a predetermined value.

Alternatively, the control apparatus may repeat the rearrangement of the color patches until the number of repeats of the rearrangement reaches a predetermined number of times.

The chart creation method may be performed on two charts relating to each other, and in such method, when a difference between an average of the average color values calculated for the subgroups all over one of the charts and an average of the average color values calculated for the subgroups all over the other of the charts, exceeds a predetermined threshold value, the control apparatus may add one or more dummy color patches into one of the two charts so as to reduce the difference not to be greater than the predetermined threshold, in the rearrangement of color patches. Where, the two chart may be a chart to be used for color calibration of the print section and a chart to be used for color calibration of the color measurement section, and the one or more dummy color patches may be added into the chart to be used for color calibration of the color measurement section.

Further, in the rearrangement, the control apparatus may obtain the size of a sheet of paper to be used for creating a chart, from the image forming apparatus, and calculate the number of color patches which can be arranged within a sheet of paper of the size obtained, divide the chart into a plurality of pieces in accordance with the number of color patches, and perform the rearranging the plurality of color patches on each of the pieces of the chart.

Alternatively, in the rearrangement, the control apparatus may obtain the measured color values of a margin located on a periphery of the chart, and for the subgroup in which the one color patch is located on a periphery of an area of the plurality of color patches and the number of the neighboring color patch is less than that of other subgroups, calculate the average color value by using the measured color values of color patches forming the subgroups and the measured color values of the margin.

With this method, for any of color patches in a chart, the influence of diffuse reflection on neighboring color patches of the color patch concerned becomes equivalent (or within a predetermined range). Accordingly, the accuracy of color measurement can be enhanced, and accurate color calibration can be executed by using a chart. Further, to restrict the influence, rather than arranging a region for restricting diffuse reflection of light between patches in a chart, the method employs just rearranging color patches in a chart. Accordingly, the number of chart sheets does not increase differently from the conventional technique, and it becomes possible to prevent excessive consumption of consumption materials and an increase in measurement time.

EXAMPLES

Example 1

Figure 2:
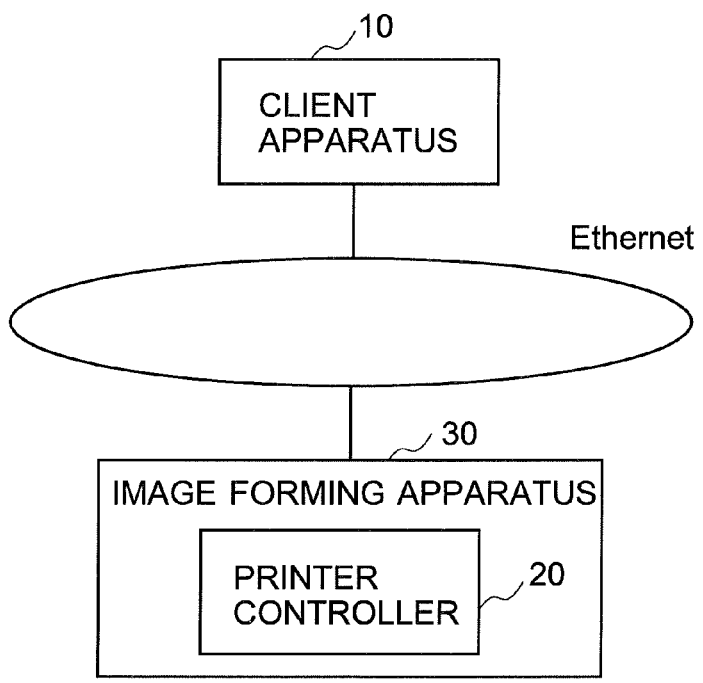
FIG. 2 is a schematic diagram illustrating another example of the constitution of a printing system pertaining to Example 1.
Figure 3A:
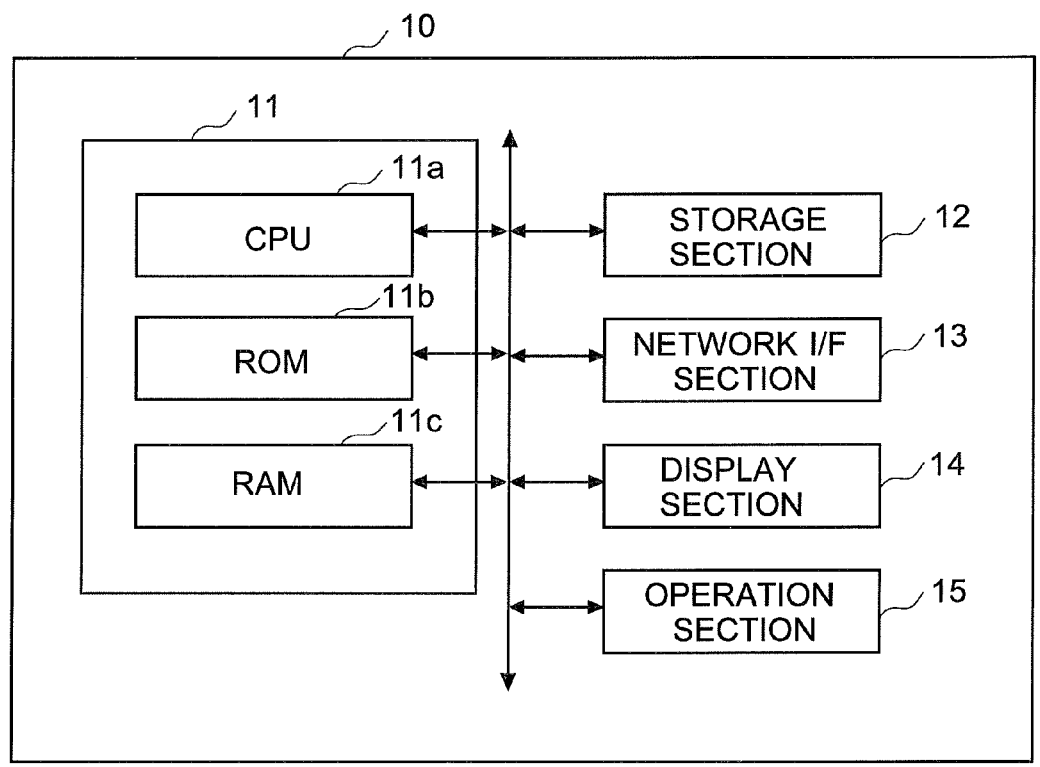
FIGS. 3A and 3B are block diagrams illustrating an example of the constitution of a client apparatus pertaining to Example 1.
Figure 3B:
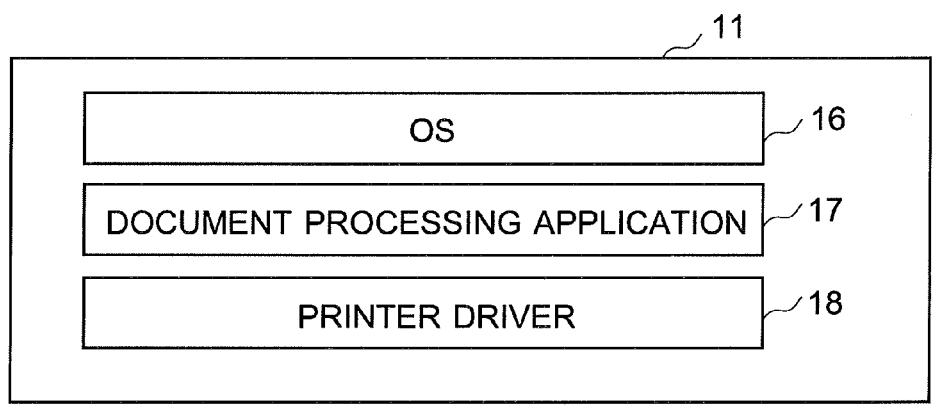
Figure 4A:
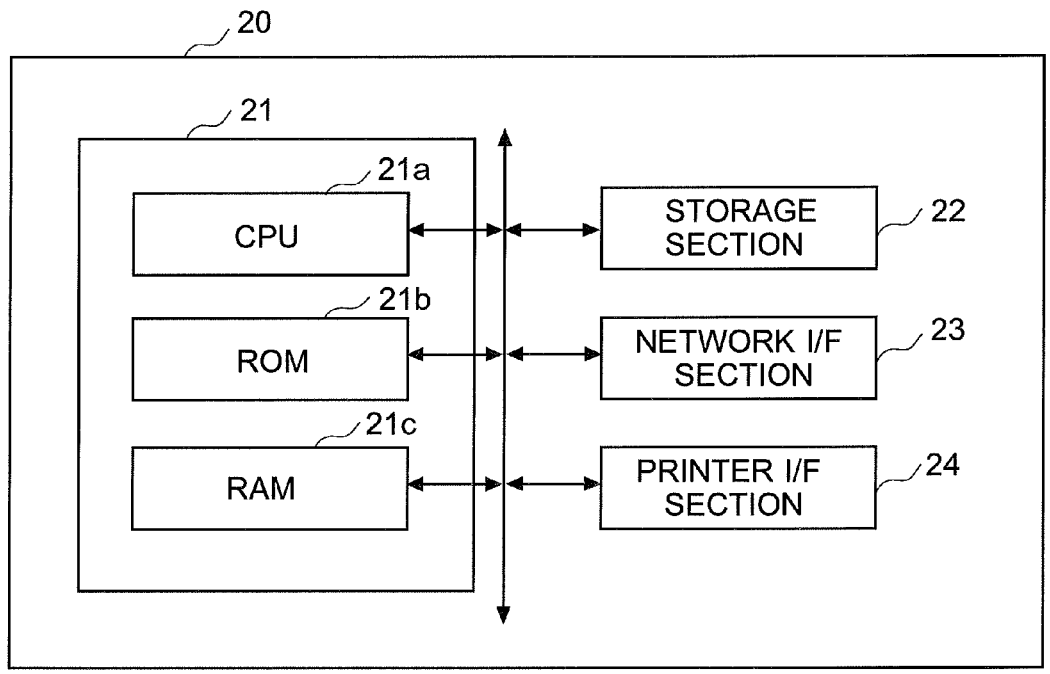
FIGS. 4A and 4B are block diagrams illustrating an example of the constitution of a printer controller pertaining to Example 1.
Figure 4B:
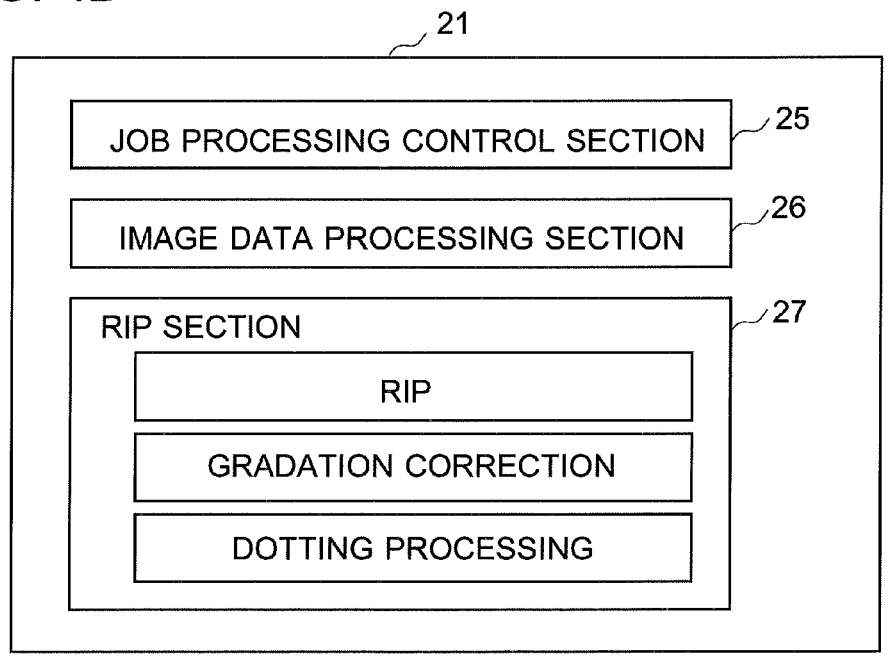
Figure 5:
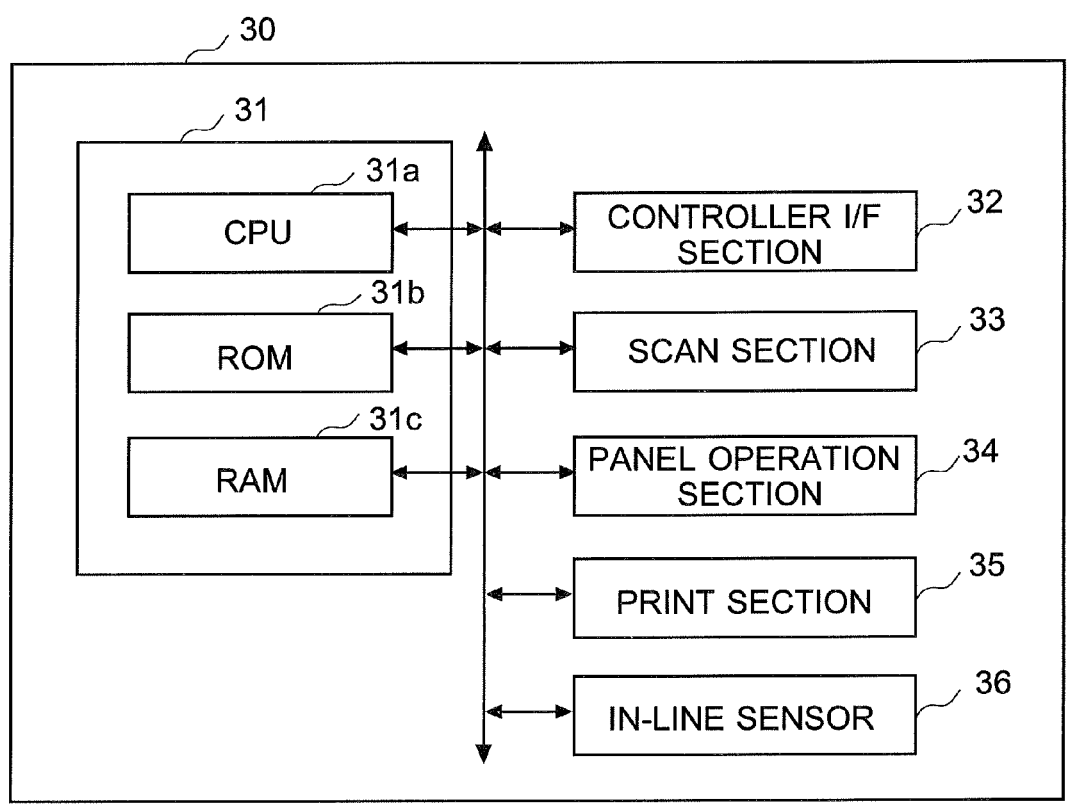
FIG. 5 is a block diagram illustrating an example of the constitution of an image forming apparatus pertaining to Example 1.
Figure 6:
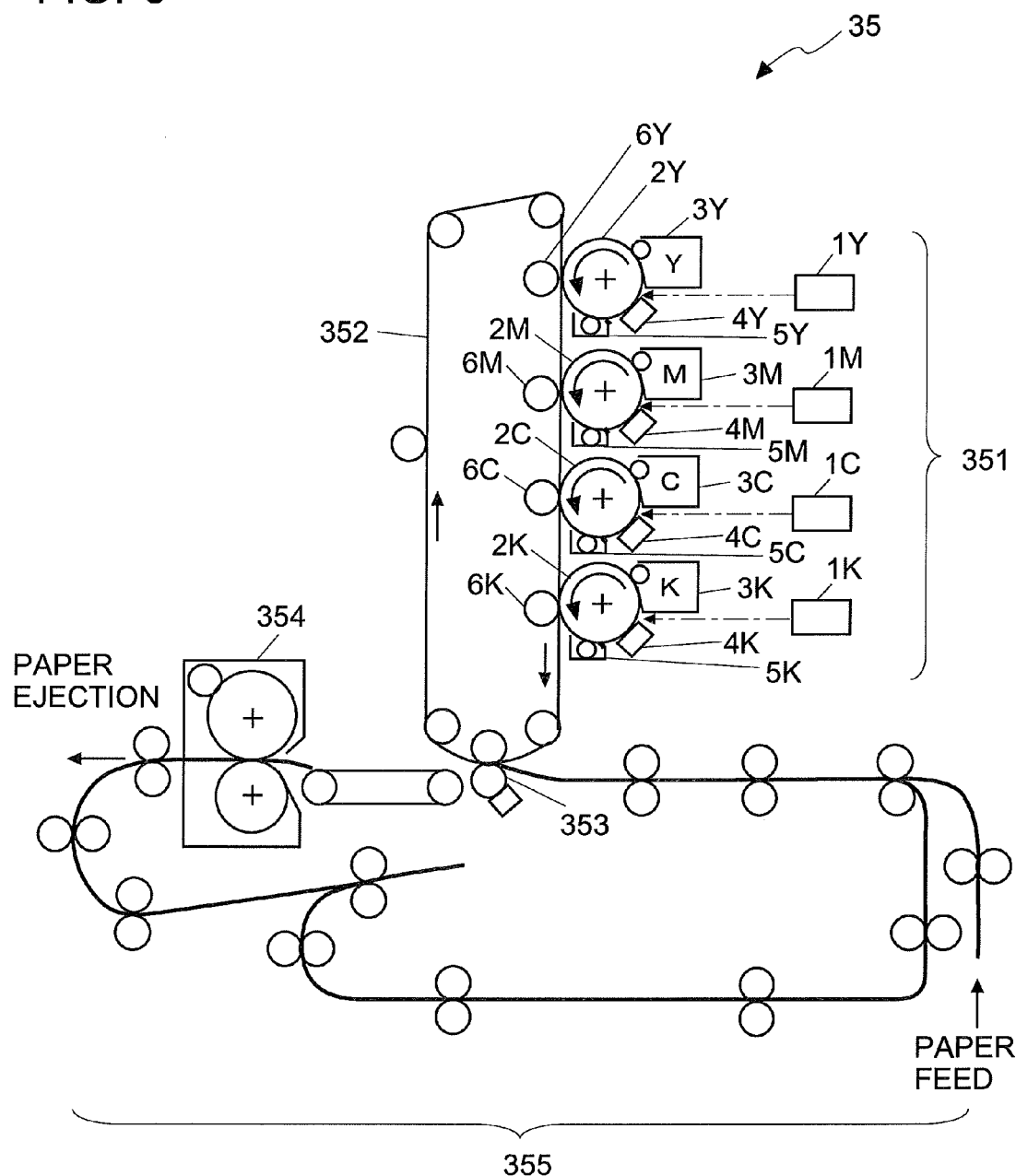
FIG. 6 is a schematic diagram illustrating and example of the constitution of an engine of the image forming apparatus pertaining to Example 1.
Figure 7:
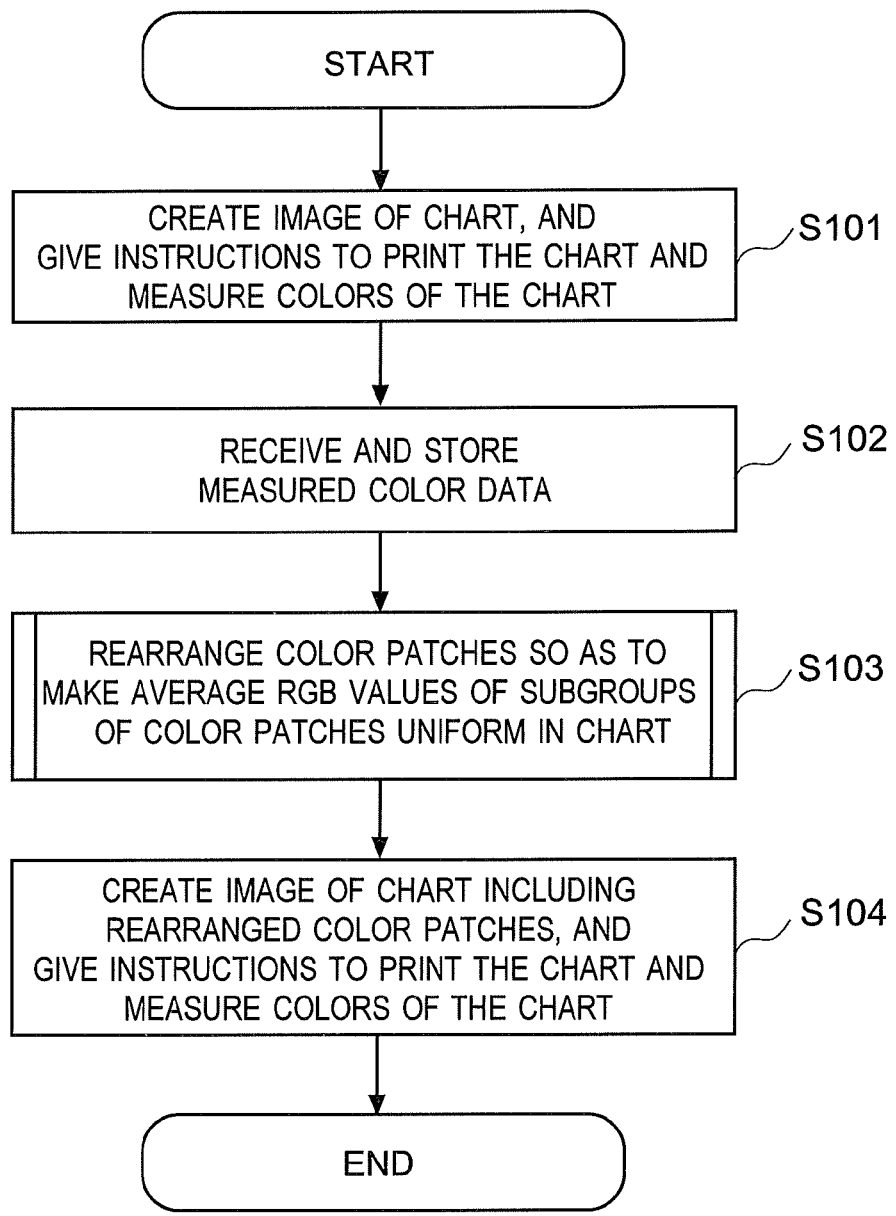
FIG. 7 is a flowchart illustrating an example of the operation of the printer controller pertaining to Example 1.

In order to describe the above-mentioned embodiment of the present invention in more detail, description will be given to a chart creation control program, a control apparatus, and a chart creation method pertaining to Example 1 with reference to FIG. 1 to FIG. 20B. FIG. 1 and FIG. 2 each is a schematic diagram illustrating an example of the constitution of a printing system of the present example, FIGS. 3A and 3B are block diagrams illustrating an example of the constitution a client apparatus, and FIGS. 4A and 4B are block diagrams illustrating an example of the constitution of a printer controller. Further, FIG. 5 is a block diagram illustrating an example of the constitution of an image forming apparatus, and FIG. 6 is a schematic diagram illustrating and example of the constitution of an engine of the image forming apparatus. Further, FIGS. 7 to 10 each is a flowchart illustrating an example of the operation of the printer controller, and FIG. 11 to FIG. 20B are diagrams for illustrating a chart creation method of the present example concretely.

As illustrated in FIG. 1, in the printing system of the present example, a client apparatus 10, a printer controller 20, and an image forming apparatus 30 which are communicable to each other via a communication network, are arranged on an intranet. As a standard of the communication network, Ethernet etc. may be used. However, in data transfer from the printer controller 20 to the image forming apparatus 30, IEEE1394, parallel, etc. may be used in addition to Ethernet. In FIG. 1, the printer controller 20 is disposed separately from the image forming apparatus 30. Alternatively, as illustrated in FIG. 2, the printer controller 20 may be constituted to be incorporated in the image forming apparatus 30. Hereinafter, on the assumption that the printing system has the constitution illustrated in FIG. 1, each apparatus is described in detail.

Client Apparatus:

The client apparatuses 10 is a computing device, such as a personal computer, and as illustrated in FIG. 3A, the client apparatuses 10 includes a control section 11, a storage section 12, a network interface (I/F) section 13, a display section 14, an operation section 15.

The control section 11 includes a CPU (Central Processing Unit) 11$a$ and memories, such as a ROM (Read Only Memory) 11$b$ and a RAM (Random Access Memory) 11$c$, and these are connected to each other through a bus. The CPU 11$a$ reads out programs from the ROM 11$b$ or the storage section 12, loads the programs onto the RAM 11$c$, and executes the programs, thereby performing the overall control of the client apparatus 10.

As illustrated in FIG. 3B, the control section 11 executes an OS (Operating System) 16, such as Windows (registered trademark) and Mac OS (registered trademark), a document processing application 17 which can create a document on the OS 16, and a printer driver 18. The printer driver 18 converts data of a document created by the document processing application 17 into a language which can be interpreted by the printer controller 20, such as PCL (Printer Control Language) and PDL (Page Description Language) including PostScript, and specifies a printing conditions and post processing conditions, to create a print job.

The storage section 12 is constituted by a memory, such as a HDD (Hard Disk Drive) and a SSD (Solid State Drive). The storage section 12 stores programs which, when being executed, causes the CPU 11$a$ to control various sections of the apparatus, data of documents, print jobs, etc.

The network I/F section 13 includes components such as a NIC (Network Interface Card) and a modem, and performs data communication with the printer controller 20 connected via the network, and transmits a print job and other data.

The display section 14 includes a display, such as a LCD (Liquid Crystal Display) and the like, and displays a screen for creating a document, a screen for setting printing conditions (the number of print sets, a paper type, one side print or both side print, color print or monochrome print, etc.) and post processing conditions (tab paper sheet insertion, stapling, punching, etc.), and the like. Operation section 15 includes a device, such as a mouse, a keyboard, and a touch panel which is made in one body with the display 14. Operation section 15 allows a user to perform various operations, such as creation of a document, setting up of printing conditions and post processing conditions.

Printer Controller:

The printer controllers 20 is a computing device, and works as a control apparatus which controls the image forming apparatus 30. As illustrated in FIG. 4A, this printer controller 20 includes a control section 21, a storage section 22, a network interface (I/F) section 23 and a printer interface (I/F).

The control section 21 includes a CPU 21a and memories, such as a ROM 21b and a RAM 21c, and these are connected to each other through a bus. The CPU 21a reads out programs from the ROM 21b or the storage section 22, loads the programs onto the RAM 21c, and executes the programs, thereby performing the overall control of the printer controller 20.

The above control section 21 works also as a job processing control section 25, an image data processing section 26, a RIP section 27, etc. as illustrated in FIG. 4B.

The job processing control section 25 analyzes PDL commands in a print job received from the client apparatus 10, and obtains job settings including the number of print sets, a paper kind, both side print or one side print, color print or monochrome print, objects (image, graphic, and text) used in each page, and post processing, such as tab paper sheet insertion, stapling, and punching. Then, the job processing control section 25 causes the RIP section 27 to create a print image, transmits data of the print image data to the image forming apparatus 30, and gives instructs to the image forming apparatus 30 to perform printing. Further, upon receipt of a color calibration request from the image forming apparatus 30, the job processing control section 25 gives instructions to the image data processing section 26 to create a chart.

The image data processing section 26 creates images of color patches necessary for color calibration in accordance with the instructions to create a chart given from the job processing control section 25. Successively, the image data processing section 26 transfers the images of color patches and layout information of the color patches to the RIP section 27, causes the RIP section 27 to create a print image of a chart, and gives instructions to the image forming apparatus 30 to print the chart and measure colors of the chart on the basis of the print image created by the RIP section 27. Then, the image data processing section 26 obtains measured color values (RGB values in the present example) of color patches as measured color data about the chart from the image forming apparatus 30, and stores the measurement color data in the storage section 22. Subsequently, on the basis of the measured color data about the chart, the image data processing section 26 executes color calibration including renewal of a color conversion table, so as to put the measured colors within a specified color gamut.

Further, in order to equalize the influence of light rays reflected on surroundings of a color patch to be measured (a target color patch) via diffuse reflection, the image data processing section 26 rearranges color patches with reference to the measured color data stored in the storage section 22 so as to make average color values (average RGB values in the present example) calculated for subgroups of color patches in the chart uniform (in other words, so as to restrict spread of average color values or average RGB values calculated for plural subgroups of color patches in the chart within a predetermined range). Herein, the subgroup is a group of color patches consisting of a target color patch and at least one neighboring color patch of the target color patch in the chart, and the average color value is an average of measured color values (RGB values) of color patches forming the subgroup. Then, the image data processing section 26 transfers the images of the color patches and the layout information of the rearranged color patches to the RIP section 27, and causes the RIP section 27 to create a print image of a chart. Herein, the details of the rearrangement of color patches will be described later.

The RIP section 27 translates the PDL data to create intermediate data, performs color conversion on the intermediate data by using a color conversion table, and performs rendering so as to create a print image of each page (referred to as a page image) of a document. This series of processing by the RIP section 27 is referred to as RIP processing. Further, the RIP section 27 creates a print image of a chart in which color patches are arranged, in accordance with images of the color patches and the layout information of the color patches transferred from the image data processing section 26, and transmits it to the image data processing section 26. Furthermore, the RIP section 27, if needed, performs screen processing, gradation correction, image density balance adjustment, thinning, halftone dotting processing, etc. on the print image.

Herein, the above-mentioned job processing control section 25, the image data processing section 26, and the RIP section 27 may be constituted as hardware devices. Alternatively, the job processing control section 25, the image data processing section 26, and the RIP section 27 may be provided by a chart creation control program which causes the control section 21 to function as these sections when being executed by CPU 21a. That is, the control section 21 may be configured to serve as the job processing control section 25, the image data processing section 26, and the RIP section 27, when CPU 21a executes the chart creation control program.

The storage section 22 is constituted by a memory, such as a HDD and a SSD. The storage section 22 stores programs (including the above-mentioned chart creation control program) which, when being executed, cause the CPU 21a to control various sections of the apparatus, print jobs, print image data, color conversion tables, measured color data (RGB values of color patches) of a chart, etc.

The network I/F section 23 includes components such as a NIC (Network Interface Card) and a modem, and performs data communication with the client apparatus 10 linked via the network, and receives a print job and other data. The printer I/F section 24 is an exclusive interface for connecting to the image forming apparatus 30, transmits print image data and instruction information (print instruction information and color measurement instruction information) to the image forming apparatus 30, and receives a color calibration request from the image forming apparatus 30.

Image Forming Apparatus:

The image forming apparatus 30 is a multi-functional peripheral or the like which executes printing in accordance with instructions given by the printer controller 20. As illustrated in FIG. 5, the image forming apparatus 30 includes a control section 31, a controller interface (I/F) section 32, a scan section 33, a panel operation section 34, a print section 35, and an in-line sensor 36.

The control section 31 includes a CPU 31a and memories, such as a ROM 31b and a RAM 31c, and these are connected to each other through a bus. The CPU 31a reads out programs from the ROM 31b or the storage section 32, loads the programs onto the RAM 31c, and executes the programs, thereby performing the overall control of the image forming apparatus 30. Further, the control section 31 counts the number of sheets in color printing, used hours of the apparatus, etc., and when the counted value reaches a predetermined value, the control section 31 judges that the image forming apparatus 30 becomes a state of needing color calibration, and transmits a color calibration request to the printer controller 20.

The controller I/F section 32 is an exclusive interface for connecting to the printer controller 20, receives print image data and instruction information (print instruction information and color measurement instruction information) from the printer controller 20, and transmits a color calibration request to the printer controller 20.

The scan section 33 is a color measurement section which optically scans an original loaded on an original glass or glass platen of the image forming apparatus 30 to obtain image data. The scan section 33 includes a light source to be used to scan the original, image sensors like CCDs (Charge Coupled Devices) which convert light reflected on the original into electrical signals, and A/D converters which carry out A/D conversion by using the electric signals. The scan section 33 measures colors of color patches of a chart put on the original glass or glass platen and outputs data of measured color values of the color patches as measured color data.

The panel operation section 34 is a touch panel in which a touch sensor composed of lattice-shaped transparent electrodes is formed on a display unit, such as an LCD. The panel operation section 34 displays various kinds of screens and allows a user to perform various operations on the screen.

The print section 35 is an engine which executes print processing based on a print image. In concrete terms, as illustrated in FIG. 6, the print section 35 includes an image forming section 351 that includes exposure units 1Y, 1M, 1C and 1K each for performing exposure processing by irradiating the photoreceptor with a laser beam in accordance with an print image, photoreceptor drums 2Y, 2M, 2C and 2K as photoreceptors, developing units 3Y, 3M, 3C and 3K, charging units 4Y, 4M, 4C and 4K, photoreceptor cleaning units 5Y, 5M, 5C and 5K, and primary transfer rollers 6Y, 6M, 6C and 6K, and is configured to form a toner image in each color of C, M, Y, and K. The image forming section 351 further includes an intermediate transfer belt 352 which is rotated by rollers and functions as an intermediate transfer body to convey toner images formed by the image forming section 351 to a paper sheet; a secondary transfer roller 353 which transfers toner images formed on the intermediate transfer belt 352 onto a paper sheet; a fixing unit 354 which fixes toner images transferred onto a paper sheet; and a conveying section 355 to convey a paper sheet, such as a paper sheet feeding roller, a registration roller, a loop roller, a reversing roller, and a paper sheet delivering roller, and the like.

The in-line sensor (color measurement section) 36 includes, for example, three kinds of sensors for R, G, and B colors disposed on a sheet conveyance path between the fixing section 354 and a sheet delivery tray. The in-line sensor 36 measures colors of patches of a chart formed on a sheet of paper by the print section 35, and outputs measured color data.

FIG. 1 to FIG. 6 illustrate one example of the printing system of the present example, and as long as it is possible to create a chart in which patches are rearranged so as to equalize average RGB values of subgroups of color patches on the whole chart, constitution and control of each apparatus can be modified appropriately.

For example, in the above description, the control section 21 of the printer controller 20 is provided with the function of each of the image data processing section 26 and the RIP section 27. However, in the printing system such that the printer controller 20 is constituted so as to be incorporated in the image forming apparatus 30, the control section 31 of the image forming apparatus 30 may be configured to serve as of the image data processing section 26 and the RIP section 27, when CPU 31a executes the chart creation control program (alternatively, the CPU 31a may be configured to execute the chart creation control program to cause the control section 31 works as these sections).

Next, brief description is given to the ordinary printing operation of the printing system with the above-mentioned constitution.

First, a document for printing is created by a document processing application 17 (for example, Microsoft Word and Microsoft Excel, etc.) installed beforehand in the client apparatus 10, where Microsoft, Word and Excel are either registered trademarks or trademarks of Microsoft Corporation in the United States and/or other countries. The data in an application file format created by the document processing application 17 are converted into PDL data in a PDL file format by the printer driver 18, and the PDL data are transmitted to the printer controller 20 via an intranet. At this time, instructions to perforin post processing peculiar to the image forming apparatus 30 is set to the PDL data by using settings of the printer driver 18.

The PDL data are put in the printer controller 20 in the order of arrival, the job processing control section 25 analyzes the settings of a job, and the RIP section 27 converts the PDL data into a print image. Successively, the printer controller 20 sends the instruction information based on the job settings together with the print image data to the image forming apparatus 30, and the image forming apparatus 30 executes print processing in accordance with the print image data and the instruction information. Herein, it is also possible to execute printing of the print image data stored in the printer controller 20 by using an application for job control.

Next, description is given to an example of the operation of the printer controller 20 in the case of receiving a color calibration request from the image forming apparatus 30 during processing of the above-mentioned print job. The CPU 21a loads the chart creation control program stored in the ROM 21b or the storage section 22 onto the RAM 21c and executes the program, thereby executing processes of steps shown in the flowchart of each of FIG. 7 to FIG. 10. Further, the control section 31 of the image forming apparatus 30 counts the number of sheets in color printing and used hours, thereby automatically judging necessity of color calibration. In the case where the control section 31 judges such that the image forming apparatus 30 has become a state of needing color calibration, the control section 31 transmits a color calibration request to the printer controller 20.

Upon receipt of a color calibration request from the image forming apparatus 30, the control section 21 (job processing control section 25) of the printer controller 20 gives instructions to the image data processing section 26 to create a chart. The control section 21 (the image data processing section 26) creates color patch images in accordance with the instructions to create a chart, transfers the color patch images and patch layout information to the RIP section 27, causes the RIP section 27 to create a print image of a chart, transmits the print image data of the chart to the image forming apparatus 30, and gives instructions to the image forming apparatus 30 to print the chart and measure colors of the chart (S101). The print section 35 of the image forming apparatus 30 executes printing of the chart, the scanning section 33 or the in-line sensor 36 measures colors of the color patches of the chart, and the control section 31 transmits measured color data to the printer controller 20. Successively, the control section 21 (the image data processing section 26) receives the measured color data (RGB values) from the image forming apparatus 30, and stores the RGB values of color patches of the chart in the storage section 22 (S102). FIG. 11 shows an example of an R value, a B value, and a G value (hereafter, called RGB values) obtained by measuring colors of color patches 40, and these RGB values include influence of diffuse reflection of light on neighboring color patches. Herein, in this flow, creation of a print image of a chart, print and color measurement of a chart, and storage of measured color data are performed. However, in the case where measured color data are stored beforehand in the storage section 22, the step of each of S101 and S102 can be omitted.

Next, the control section 21 (the image data processing section 26) reads out the measured color data from the storage section 22, and rearranges color patches so as to make average RGB values of subgroups of color patches uniform (in other words, so as to restrict spread of the average RGB values within a predetermined range) throughout the chart (S103). Herein, the subgroup of color patches is a group of an arbitrary number of color patches consisting of a target color patch and one or more neighboring color patches of the target color patch in the chart. The details of this step will be mentioned later.

Successively, the control section 21 (the image data processing section 26) transmits the color patch images and layout information of the rearranged color patch to the RIP section 27, and the control section 21 (the RIP section 27) creates a print image of a chart in which the color patches are arranged in accordance with the layout information (S104).

Subsequently, the control section 21 (the image data processing section 26) transmits the print image data of a chart to the image forming apparatus 30, and gives instructions to the image forming apparatus 30 to print the chart and measure colors of the chart. The print section 35 of the image forming apparatus 30 prints the chart, the in-line sensor 36 measures colors of color patches of the chart, and the control section 31 transmits measured color data to the printer controller 20. Then, the control section 21 (the image data processing section 26) receives the measured color data of the chart from the image forming apparatus 30, and executes color calibration, such as renewal of the color conversion table based on the measured color data.

Next, description is given concretely to the rearrangement of color patches at the above-mentioned S103. This rearrangement of patches can be realized by several techniques. Hereinafter, the rearrangement of color patches performed by the control section 21 (the image data processing section 26) is described in order.

Figure 8:
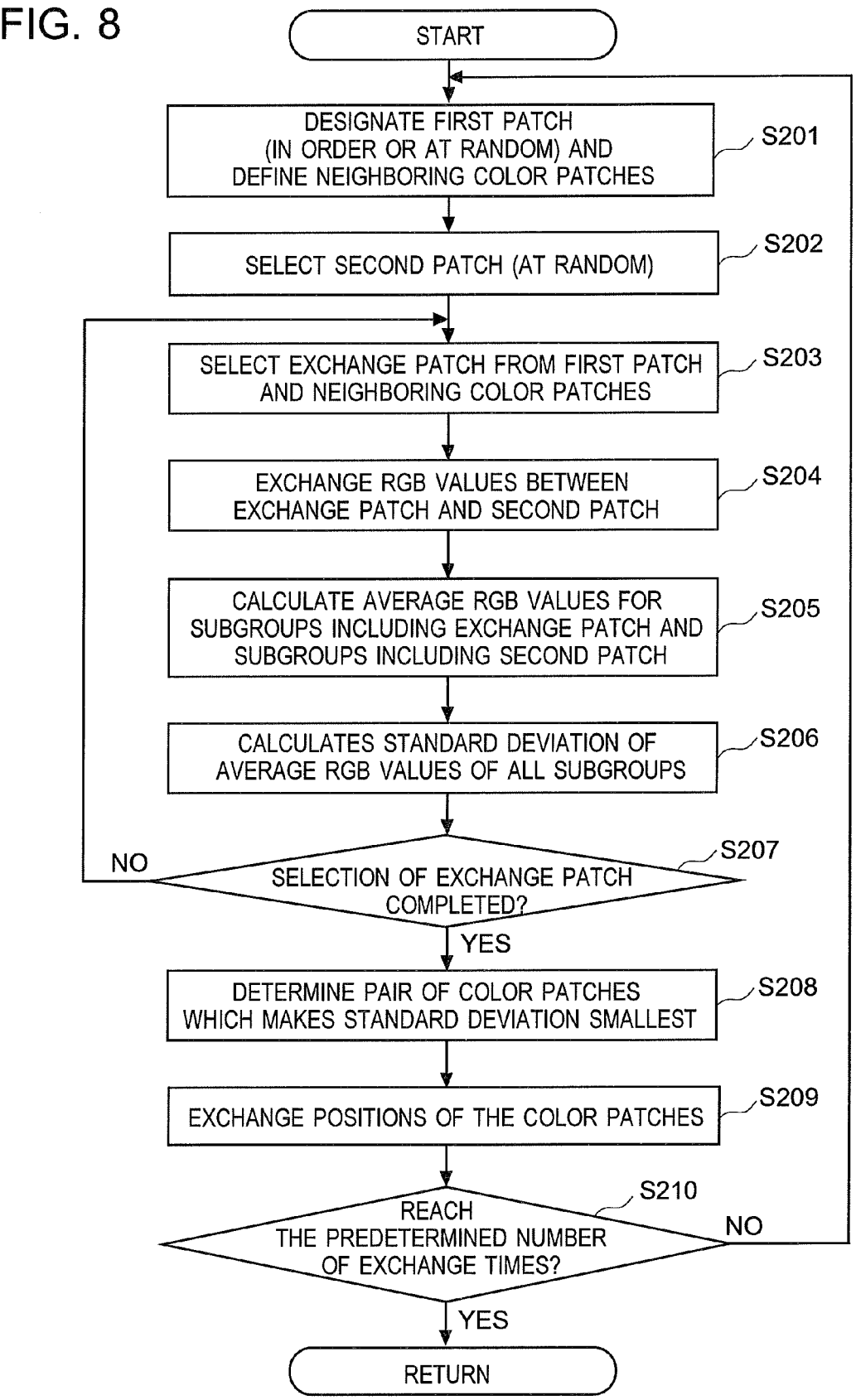
FIG. 8 is a flowchart illustrating an example of the operation (an example of rearrangement of color patches) of the printer controller pertaining to Example 1.

First Technique:

As illustrated in FIG. 8, first, the control section 21 (the image data processing section 26) designates a first patch from among plural color patches constituting the chart, and defines one or more neighboring color patches which are located adjacent to the first patch (S201). A subgroup of color patches is formed by the first patch and the neighboring color patches. Herein, a first patch may be designated in accordance with the order of arrangement of the color patches, or may be designated at random. FIG. 12 is a diagram illustrating a relationship among a color patch 40, neighboring color patches 41, and a subgroup of color patches 42, and in this example, by showing color patches arranged in a 8-by-8 matrix extending in the X-axis direction (the transverse direction in the figure) and the Y-axis direction (the vertical direction in the figure), are 64 color patches in total. In FIG. 8, a numeral written in a rectangular of each color patch represents x and y coordinates which indicates a patch position in order to make description easy.

The subgroup 42A in FIG. 12 shows an example of a subgroup 42 consisting of four color patches 40. For example, when the color patch 40 at the coordinate position of "22" is defined as a target of color measurement, three color patches at the coordinate positions of "32", "33", and "23" are made as neighboring color patches 41. These neighboring color patches 41 should not be limited to the above-mentioned example, and may be three color patches at the coordinate positions of "21", "31", and "32" (color patches in the upper right direction of the target color patch), three color patches at the coordinate positions of "12", "11", and "21" (color patches in the upper left direction the target color patch), or three color patches at the coordinate positions of "23", "13", and "12" (color patches in the lower left direction the target color patch). Further, subgroup 42B in FIG. 12 shows an example of a subgroup 42 consisting of nine color patches 40. For example, in the case where the color patch 40 at the coordinate position of "66" is defined as a target of color measurement, eight color patches at the coordinate positions of "55", "65", "75", "76", "77", "67", "57", and "56", are made as neighboring color patches 41.

Herein, the number of neighboring color patches 41 or the respective positions of neighboring color patches 41 should not be limited to the examples shown in FIG. 12, and it may be permissible that at least one color patch neighboring the target color patch 40 is designated as a neighboring color patch 41. For example, a color patch neighboring the target color patch in any one direction of upper, lower, left and right may be made as a neighboring color patch 41, two color patches neighboring the target color patch at upper and lower or left and right may be made as neighboring color patches 41, four color patches neighboring the target color patch at upper, lower, left and right may be made as neighboring color patches 41, or four color patches neighboring the target color patch in two diagonal directions may be made as neighboring color patches 41. Further, in the case where the first color patch is a patch located on a periphery of the chart (or on a periphery of the matrix of color patches), there is no color patch neighboring the target color patch on its outside. In such a case, color patches neighboring the target color patch in the directions other than the outside may be specified as neighboring color patches 41.

Figures 13A, 13B:
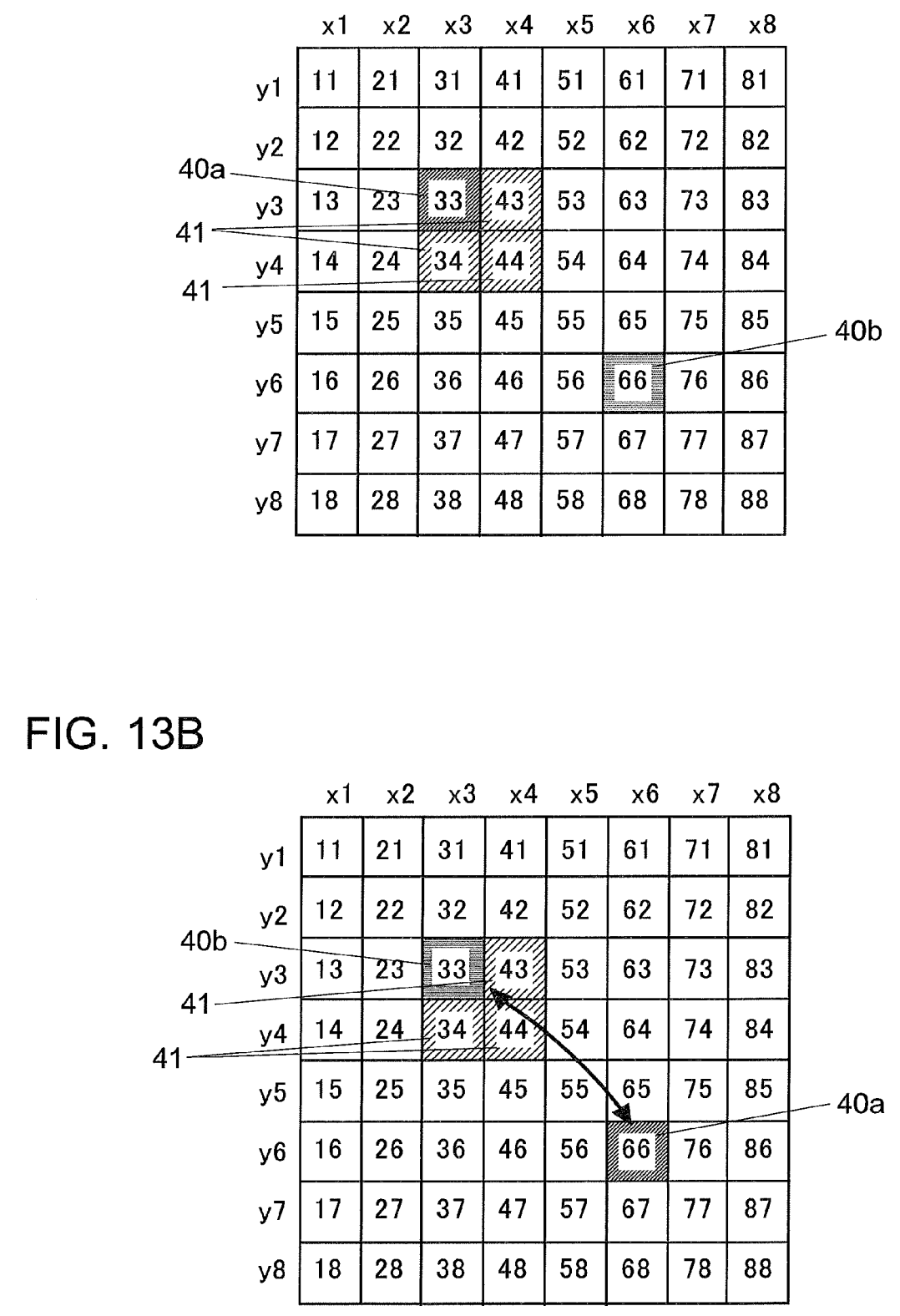

Next, the control section 21 (the image data processing section 26) selects a second patch (S202). This second patch is selected at random. Next, from among the first patch and the neighboring color patches designated at S201, the control section 21 (the image data processing section 26) successively selects color patches as exchange patches (S203). FIG. 13A illustrates a specific example of the steps so far. In this example, the first patch 40a is a color patch at the coordinate position of "33", the neighboring color patches 41 are color patches at the coordinate positions of "43", "44", and "34", and the second patch 40b is a color patch at the coordinate position of "66". In the case of this example, the first patch 40a at the coordinate position of "33" is selected as an exchange patch.

Next, the control section 21 (the image data processing section 26) exchanges the RGB values between the exchange patch (here, the first patch 40a) and the second patch 40b (S204). For example, as shown in FIG. 13B, the control section 21 (the image data processing section 26) exchanges the RGB values between the color patch at the coordinate position of "33" and the color patch at the coordinate position of "66". Herein, in the figure, in order to make the exchange of the RGB values easy to understand, the appearances of the color patches themselves are replaced with each other.

Next, the control section 21 (the image data processing section 26) calculates average RGB values for all the subgroups each including the exchange patch (here, the first patch 40a) and average RGB values for all the subgroups each including the second patch 40b (S205). For example, as shown in FIG. 13C, there are four subgroups 42 including the color patch at the coordinate position of "33": the subgroup 42 of color patches at the coordinate positions of "22", "32", "33", and "23"; the subgroup 42 of color patches at the coordinate positions of "23", "33", "34", and "24"; the subgroup 42 of color patches at the coordinate positions of "33", "43", "44", and "34"; and the subgroup 42 of color patches at the coordinate positions of "32", "42", "43", and "33". Further, there are four subgroups 42 including the color patch at the coordinate position of "66"; the subgroup 42 of color patches at the coordinate positions of "55", "65", "66", and "56"; the subgroup 42 of color patches at the coordinate positions of "56", "66", "67", and "57"; the subgroup 42 of color patches at the coordinate positions of "66", "76", "77", and "67"; and the subgroup 42 of color patches at the coordinate positions of "65", "75", "76", and "66". Then, for each of these subgroups of color patches, the control section 21 (the image data processing section 26) adds the RGB values of the color patches forming the corresponding subgroups of color patches, and divides the sum of the RGB values with the number of the color patches constituting the subgroup, to obtain the average RGB value.

Next, the control section 21 (the image data processing section 26) calculates a standard deviation of the average RGB values calculated for these subgroups of color patches (in FIG. 13C, the average RGB values calculated for eight subgroups of color patches) (S206). For example, on the assumption that the number of the subgroups of color patches is represented by n, the average RGB values of the subgroups are represented by RGB1 to RGBn, and the average of RGB1 to RGBn are represented by RGB (ave), the standard deviation σ can be calculated by Formula (1) and Formula (2).

$$RGB(ave) = \frac{1}{n}\sum_{i=1}^{n} RGBi \qquad (1)$$

$$\sigma^2 = \frac{1}{n}\sum_{i=1}^{n}(RGBi - RGB(ave))^2 \qquad (2)$$

Next, the control section 21 (the image data processing section 26) judges whether all the color patches of the subgroup consisting of the first patch and the neighboring color patches have been selected as exchange patches (S207). If there is a color patch which has not been selected as an exchange patch, the processing returns to S203, and the same processing is repeated. At this time, the RGB values exchanged at S204 are made to return to the original values. FIGS. 14A to 14C illustrate an example that one neighboring color patch 41 at the coordinate position of "34" is selected as an exchange patch. Similarly to the example of FIGS. 13A to 13C, the control section 21 (the image data processing section 26) exchanges the RGB values between the neighboring color patch 41a as an exchange patch and the second patch 40b (see FIGS. 14A and 14B), and calculates the average RGB values for all the subgroups each including the neighboring color patch 41a as an exchange patch and the average RGB values for all the subgroups each including the second patch 40b (see to FIG. 14C). Then, the control section 21 (the image data processing section 26) calculates a standard deviation of the average RGB values of these subgroups of color patches.

Next, the control section 21 (the image data processing section 26) calculates a standard deviation of the average RGB values calculated for the subgroups of color patches, at each time when selecting one color patch as an exchange patch from among the first patch 40a and the neighboring color patches 41 sequentially, and compares the calculated standard deviations with each other. Then, the control section 21 (the image data processing section 26) determines a pair of the exchange patch and the second patch which makes the standard deviation the smallest (S208). For example, a standard deviation calculated when the pair of color patches shown in FIGS. 13A to 13C are selected is assumed to be σ1, a standard deviation calculated when the pair of color patches shown in FIGS. 14A to 14C is assumed to be σ2, and similarly, standard deviations calculated when selecting the other neighboring color patches 41 as an exchange patches are assumed to be σ3 and σ4 respectively. Under the assumption, the control section 21 (the image data processing section 26) compares the values σ1 to σ4 with each other, and defines the pair of color patches which were selected when the smallest standard deviation was obtained.

Next, the control section 21 (the image data processing section 26) exchanges the positions between the pair of color patches defined (S209). Then, the control section 21 judges whether the number of repeats of the exchange (rearranging) of color patches reaches a predetermined number of times (S210). In the case where the number of exchange times has not reached the predetermined number, the processing returns to S201, and the same processing is repeated.

The above flow shows an example that subgroups consisting of four color patches are used. Alternatively, as illustrated in FIGS. 15A to 15C, the control section 21 may designate eight color patches located around the first patch 40a as neighboring color patches 41, and may successively select color patches as exchange patches from a subgroup of the first patch and these neighboring color patches. In that case, as shown in FIG. 15C, there are 18 subgroups including the exchange patch or the second patch 40b, and there are nine color patches in each subgroup including the exchange patch and each subgroup including the second patch 40b. The control section 21 calculates nine standard deviations while successively selecting the exchange patches, compares the nine standard deviations with each other, and defines a pair of color patches which makes the standard deviation smallest. Further, in the above flow, when the number of times of the exchanges of color patches has reached a predetermined number, the rearrangement of color patches is completed. Alternatively, the rearrangement of patches may be completed when a standard deviation of the average RGB values of subgroups of color patches all over the chart becomes equal to or less than a predetermined value.

Figure 9:
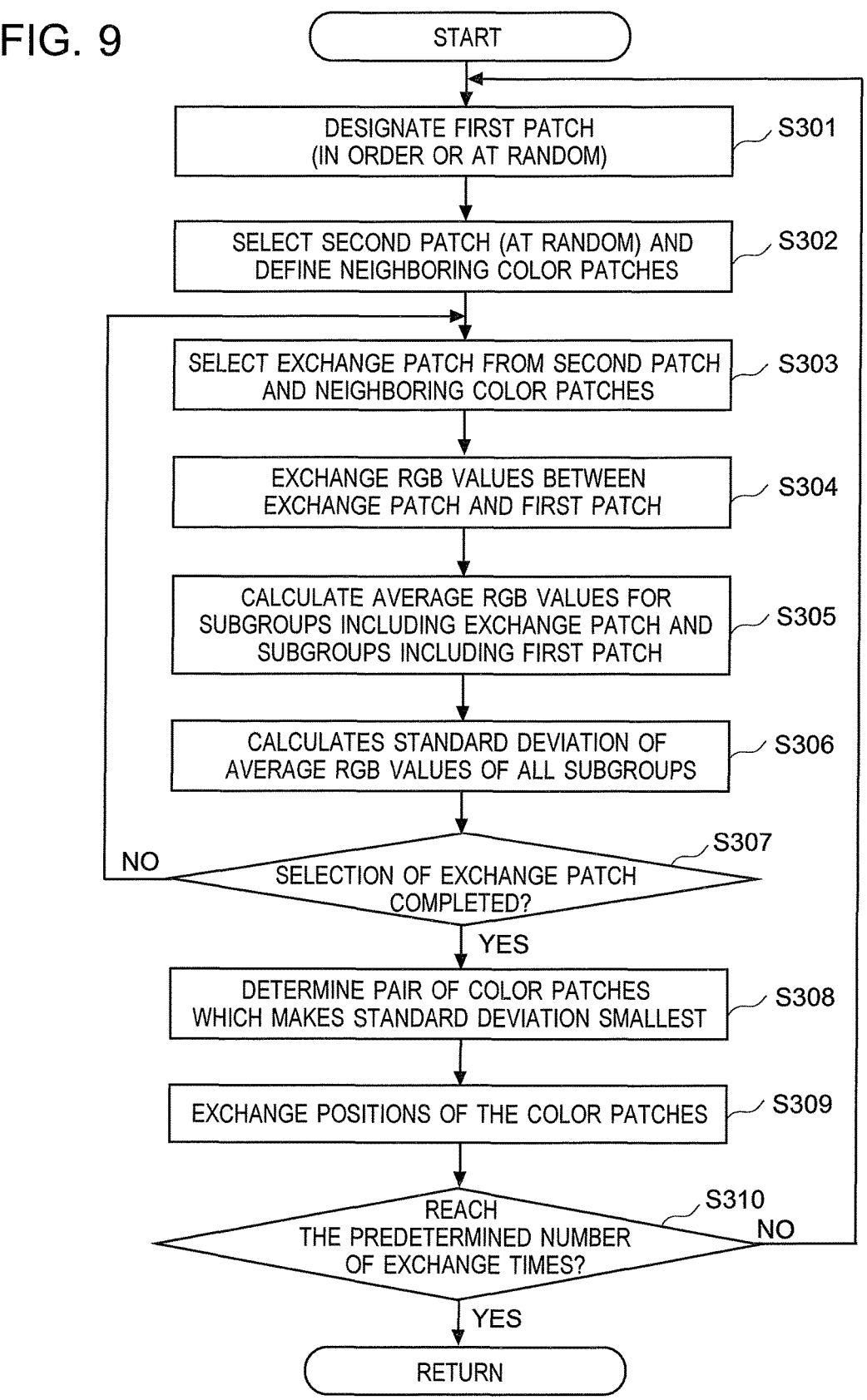
FIG. 9 is a flowchart illustrating an example of the operation (another example of rearrangement of color patches) of the printer controller pertaining to Example 1.

Second Technique:

In the above-mentioned first technique, the control section 21 selects exchange patches form among a first patch and neighboring color patches of the first patch. Alternatively, exchange patches may be selected from among a second patch and neighboring color patches of the second patch. FIG. 9 shows the procedure in that case.

First, the control section 21 (the image data processing section 26) designates a first patch in order of arrangement of the color patches or at random, from among plural color patches constituting the chart (S301). Next, the control section 21 selects a second patch at random and defines one or more neighboring color patches which are located adjacent to the second patch (S302). Next, the control section 21 successively select exchange color patches from among the second patch and the neighboring color patches selected at S302 (S303). FIG. 16A shows a specific example of the steps so far. In this example, a first patch 40a is the color patch at the coordinate position of "33", a second patch 40b is the color patch at the coordinate position of "66", and neighboring color patches 41 are the color patches at the coordinate positions of "76", "77", and "67". In the case of this example, the second patch 40b at the coordinate position of "66" is selected as an exchange patch.

Next, the control section 21 exchanges the RGB values between the first patch 40a and an exchange color patch (here, the second patch 40b) (S304). For example, as shown in FIG. 16B, the control section 21 exchanges the RGB values between the color patch at the coordinate position of "33" and the color patch at the coordinate position of "66".

Next, the control section 21 calculates average RGB values for all the subgroups each including the first patch 40a and average RGB values for all the subgroups each including the exchange patch (here, the second patch 40b) (S305). For example, as shown in FIG. 16C, the control section 21 calculates average RGB values for all the subgroups of four color patches including the color patch at the coordinate position of "33" and all the subgroups of four color patches including the color patch at the coordinate position of "66". Then, the control section 21 calculates a standard deviation of the average RGB values calculated for these subgroups (in FIG. 16C, eight average RGB values calculated for eight subgroups) (S306).

Next, the control section 21 judges whether all the color patches of the subgroup consisting of the second patch and the neighboring color patches have been selected as exchange patches (S307). If there is a color patch which has not been selected as an exchange patch, the processing returns to S303, and the same processing is repeated. At this time, the RGB values exchanged at S304 are made to return to the original values. FIGS. 17A to 17C illustrate an example that one neighboring color patch 41 at the coordinate position of "67" is selected as an exchange patch. Similarly to the example of FIGS. 16A to 16C, the control section 21 exchanges the RGB values between the neighboring color patch 41a as an exchange patch and the first patch 40a (see FIGS. 17A and 17B), and calculates the average RGB values for all the subgroups each including the neighboring color patch 41a as an exchange patch and the average RGB values for all the subgroups each including the first patch 40a (see to FIG. 17C). Then, the control section 21 calculates a standard deviation of the average RGB values of these subgroups of color patches.

Next, the control section 21 calculates a standard deviation of the average RGB values calculated for the subgroups of color patches, at each time when selecting one color patch as an exchange patch from among the second patch 40b and the neighboring color patches 41 sequentially, and compares the calculated standard deviations with each other. Then, the control section 21 determines a pair of the exchange patch and the first patch which makes the standard deviation the smallest (S308). Next, the control section 21 exchanges the positions between the pair of color patches defined (S309). Then, the control section 21 judges whether the number of repeats of the exchange (rearranging) of color patches reaches a predetermined number of times (S310). In the case where the number of exchange times has not reached the predetermined number, the processing returns to S301, and the same processing is repeated.

Also in the second technique, the control section 21 may designate eight color patches located around the second patch 40b as neighboring color patches 41, and may successively select color patches as exchange patches from the subgroup of the second patch and these neighboring color patches. Further, the rearrangement of patches may be completed when a standard deviation of the average RGB values of subgroups of color patches all over the chart becomes equal to or less than a predetermined value.

Figure 10:
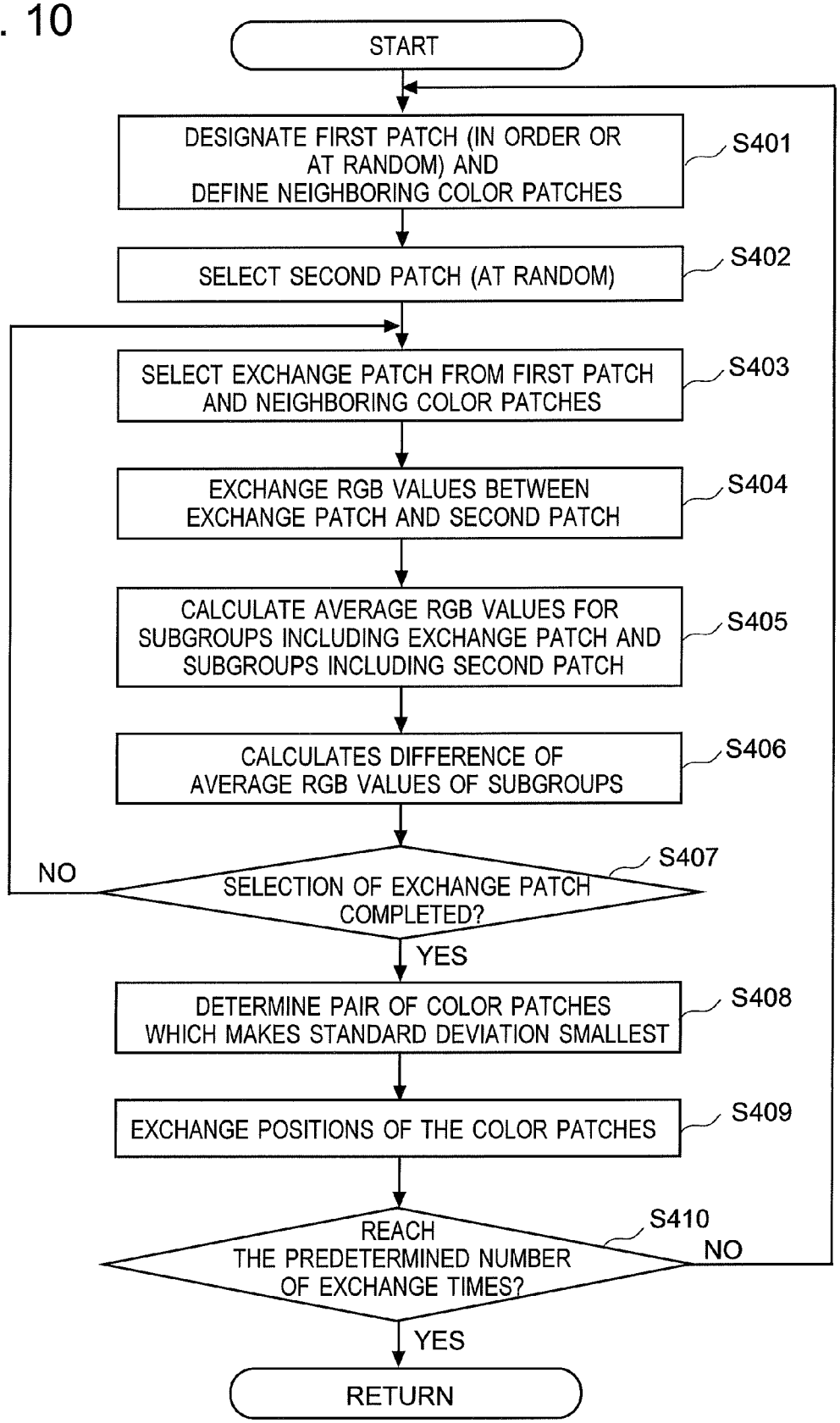
FIG. 10 is a flowchart illustrating an example of the operation (another example of rearrangement of color patches) of the printer controller pertaining to Example 1.

Third Technique:

In the above-mentioned first and second techniques, the control section 21 selects a pair of color patches to be exchanged on the basis of a standard deviation of the average RGB values of all the subgroups of color patches including an exchange patch. Alternatively, a pair of color patches to be exchanged can be selected on the basis of a difference between an average of average RGB values of all the subgroups each including one color patch and an average of average RGB values of all the subgroups each including the other color patch. That is, as an index representing spread of the average RGB values of subgroups of color patches in a chart, a difference between an average of average RGB values of first subgroups of color patches and an average of average RGB values of second subgroups of color patches, in place of a standard deviation. FIG. 10 shows the procedure in that case.

First, the control section 21 (the image data processing section 26) designates a first patch in order of arrangement of the color patches or at random, from among plural color patches constituting the chart and defines one or more neighboring color patches which are located adjacent to the first patch (S401). Next, the control section 21 selects a second patch at random (S402). Next, the control section 21 successively select exchange color patches from among the first patch and the neighboring color patches selected at S401 (S403), and exchanges the RGB values between the exchange patch and the second patch (S404).

Next, the control section 21 calculates average RGB values for all the subgroups each including the exchange patch and average RGB values for all the subgroups each including the second patch (S405), and calculates the difference between the average of the average RGB values for all the subgroups each including the exchange patch and the average of the average RGB values for all the subgroups each including the second patch (S406). Then, the control section 21 judges whether all the color patches of the subgroup consisting of the first patch and the neighboring color patches have been selected as exchange patches (S407). If there is a color patch which has not been selected as an exchange patch, the processing returns to S403, and the same processing is repeated. At this time, the RGB values exchanged at S404 are made to return to the original values.

Next, the control section 21 calculates average RGB values calculated for the subgroups of color patches and calculates a difference between two kinds of averages of the average RGB, at each time when selecting one color patch as an exchange patch from among the first patch and the neighboring color patches 41 sequentially, and compares the calculated differences with each other. Then, the control section 21 determines a pair of the exchange patch and the second patch which makes the difference the smallest (S408). Next, the control section 21 exchanges the positions between the pair of color patches defined (S409). Then, the control section 21 judges whether the number of repeats of the exchange (rearranging) of color patches reaches a predetermined number of times (S410).

Also in the third technique, as shown in the second technique, the control section 21 may select an exchange patch from among the second patch and the neighboring color patches of the second patch. Further, the control section 21 may designate eight color patches located around the first or second patch as neighboring color patches 41, and may successively select color patches as exchange patches from the subgroup of color patches. Further, the rearrangement of patches may be completed when a standard deviation of the average RGB values of subgroups of color patches all over the chart becomes equal to or less than a predetermined value.

Furthermore, in the above-mentioned first to third techniques, the control section 21 calculates a standard deviation of average RGB values calculated for subgroups of color patches or a difference between two averages of average RGB values calculated for two subgroups, at each time when selecting one color patch as an exchange patch from among the first or second patch and the neighboring color patches 41 sequentially. Then, the control section 21 compares the calculated standard deviations or differences with each other to define a pair of color patches to be exchanged. Alternatively, the control section 21 may compare a difference between the average RGB value of the first patch and the neighboring color patches and the average RGB value of the second patch and the neighboring color patches, before exchanging the RGB values between the color parches with that after exchanging the RGB values between the color parches; and may exchange the positions of the color patches when the difference becomes small by the exchange.

Figure 18A:
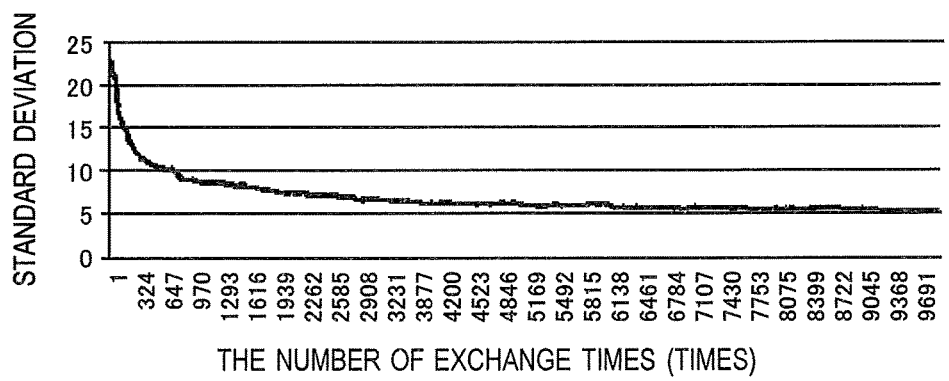
FIGS. 18A, 18B and 18C are graphs illustrating a situation that the a standard deviation of average RGB values converges to a certain value in a chart (including 500 patches) pertaining to Example 1.
Figure 18B:
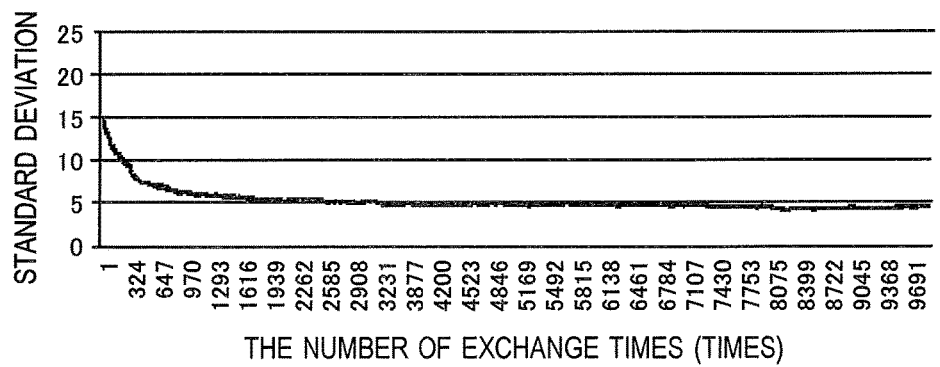
Figure 18C:
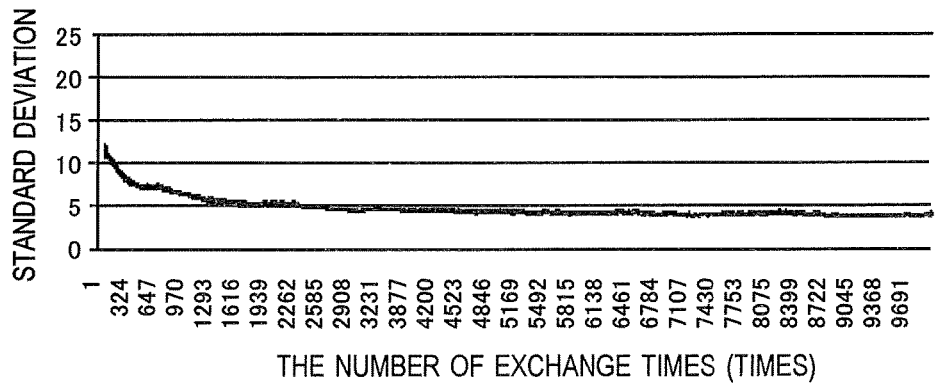

FIGS. 18A to 18C are graphs each illustrating a change of the standard deviation of the average RGB values of subgroups of color patches all over the chart including 500 color patches at the time of performing replacement of color patches by using the first technique, for R values, G values, and B values, respectively. As can be understood from the graphs of the R values, the G values, and the B values, as the number of exchange times of increases, the value of a standard deviation becomes small and converges to a certain value.

Figure 19A:
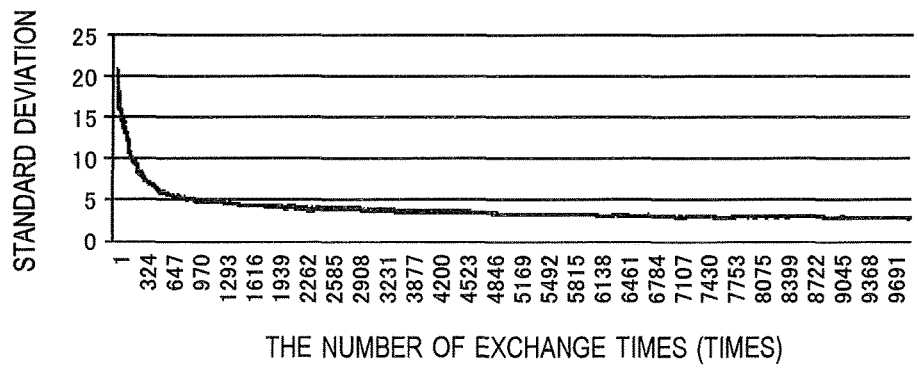
FIGS. 19A, 19B and 19C are graphs illustrating a situation that the a standard deviation of average RGB values converges to a certain value in a chart (including 600 patches) pertaining to Example 1.
Figure 19B:
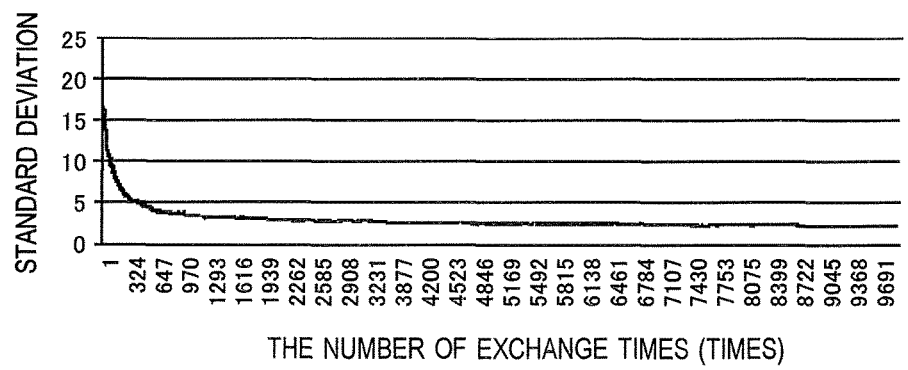
Figure 19C:
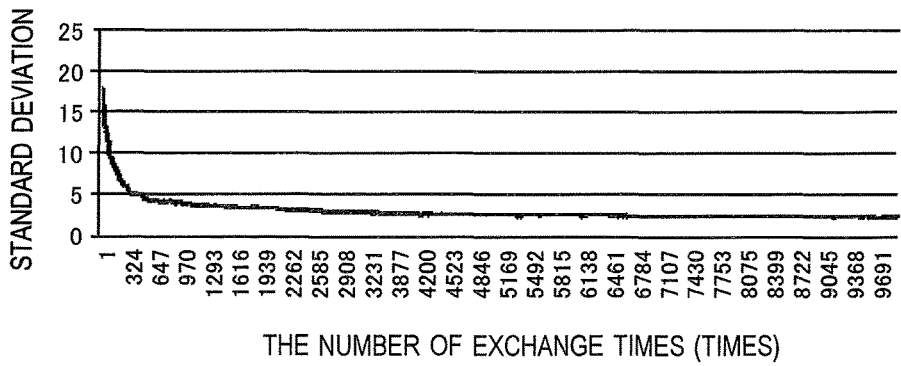

FIGS. 19A to 19C are graphs each illustrating a change of the standard deviation of the average RGB values of subgroups of color patches all over the chart including 600 color patches at the time of performing replacement of color patches by using the first technique, for R values, G values, and B values, respectively. As compared with FIGS. 18A to 18C, the value of a standard deviation tends to reduce, and a converging value becomes small.

From the above description, it turns out that, exchanging the positions between color patches by using the techniques of the present examples, reduces the spread of the average RGB values of subgroups of color patches all over the chart becomes small gradually, and the influence of diffuse reflection of light on neighboring color patches becomes uniform in the chart. Further, in the case where the maximum number of times of patch exchanges is set to a proper value in accordance with the number of color patches in a chart, the influence of irregular reflection of light on neighboring color patches can be suppressed to a predetermined level in a short time.

Figure 20A:
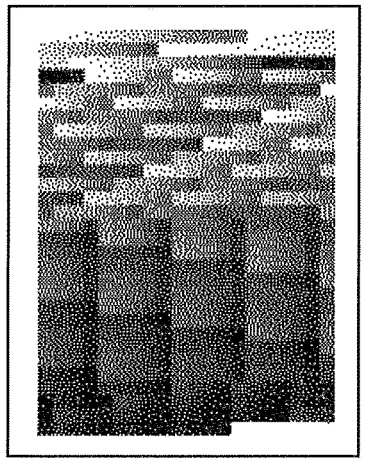
FIGS. 20A and 20B illustrates a specific example of a printer profile chart before and after rearrangement of color patches, pertaining to Example 1.
Figure 20B:
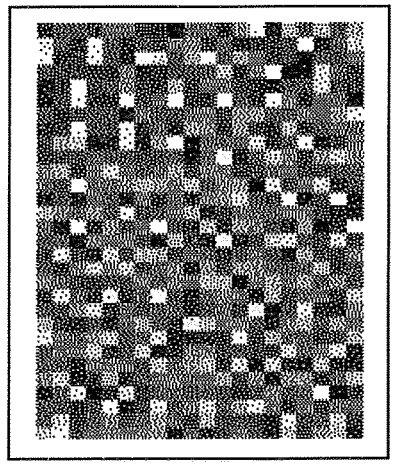

FIGS. 20A and 20B show a result at the time of applying the first technique to a printer profile chart to be used for creating a printer profile. FIG. 20A shows the chart before the rearrangement of color patches, and FIG. 20B shows a result after the rearrangement of color patches. As can be understood from FIGS. 20A and 20B, by employing the techniques of the present example, color patches with high RGB values (black patches in the figure) and color patches with low RGB values (white patches in the figure) are arranged so as to disperse in the chart. Accordingly, a change of measured color values due to diffuse reflection of light on color patches neighboring a target color patch can be suppressed effectively, and it becomes possible to measure colors of a chart with high accuracy.

Example 2

Figure 21:
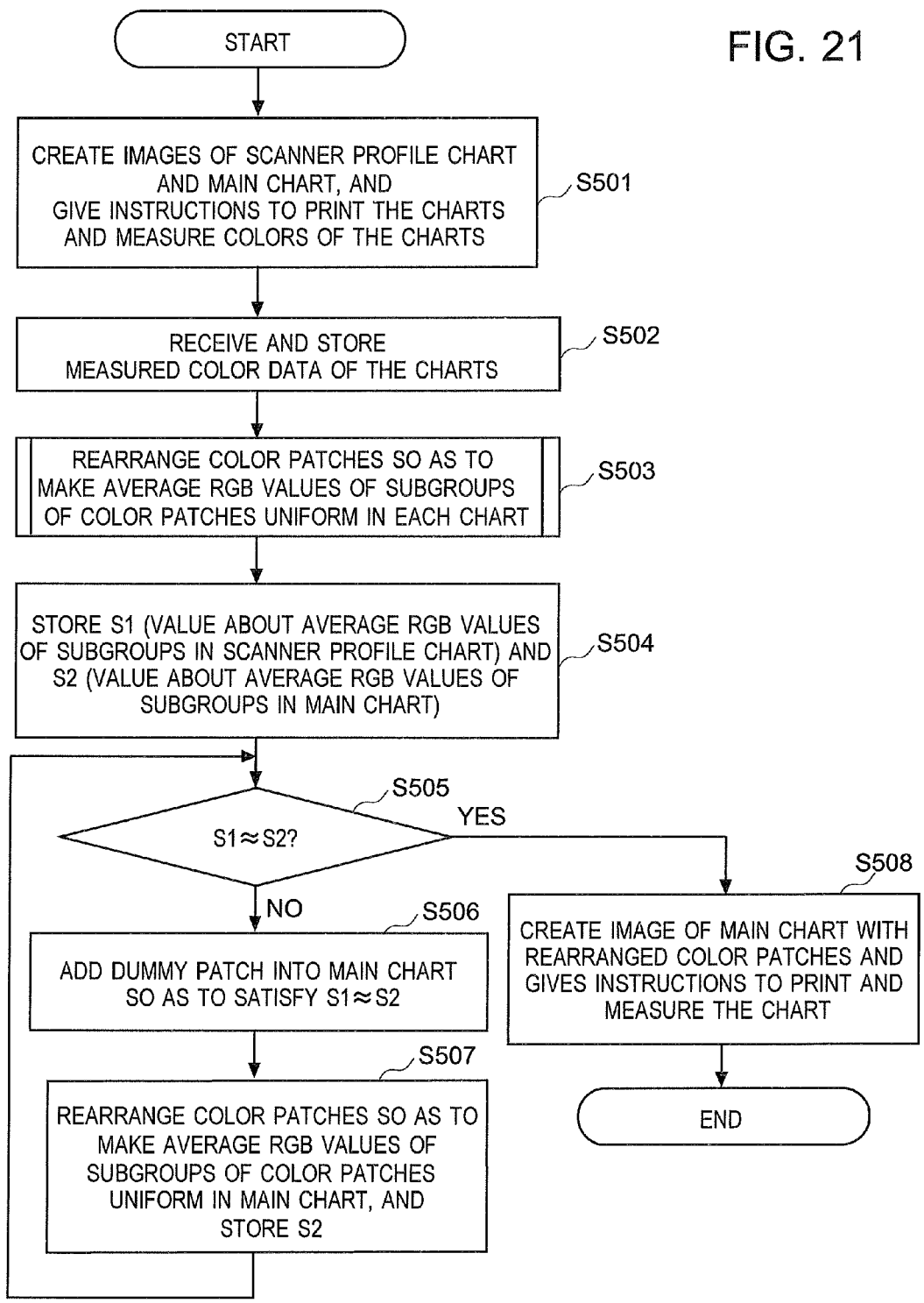
FIG. 21 is a flowchart illustrating an example of the operation of a printer controller pertaining to Example 2.

Next, description will be given to a chart creation control program, a control apparatus, and a chart creation method pertaining to Example 2 with reference to FIG. 21. FIG. 21 is a flowchart illustrating an example of the operation of the printer controller.

In the above-mentioned Example 1, the method is used for processing of one chart, and the control section 21 of the printer controller 20 rearranges color patches of the chart so as to reduce the standard deviation of the average RGB values calculated for all the subgroups of color patches in the chart. For another example, there is considered a case of creating two chart relating to each other, in concrete terms, a case of creating a chart for a scanner profile or a scanner profile chart which is a chart to be used for color calibration of a scanner and a chart to be used for color calibration after a creation of a scanner profile (referred to as a main chart). In this case, a difference in the influence of diffuse reflection of light on neighboring color patches of a target color patch between these charts may affect the reliability of the measured color data of the main chart. Then, in the present example, a main chart is created so as to equivalent the influence of diffuse reflection of light on neighboring color patches of a target color patch between a scanner profile chart and a main chart.

In that case, the constitution of each apparatus of a printing system is the same as that in the above-mentioned Example 1. However, the control section 21 (the image data processing section 26) of the printer controller 20 arranges one or more color patches not to be used for color measurement (hereafter, referred to as dummy color patches) into the main chart so as to make the average RGB values calculated for all the subgroup of color patches of the scanner profile chart and the average RGB values calculated for all the subgroup of color patches of the main chart equivalent.

Hereinafter, description is given to an example of operation of the printer controller 20 in the case of creating the scanner profile chart and the main chart. The CPU 21a loads the chart creation control program stored in the ROM 21b or the storage section 22 onto the RAM 21c and executes the program, thereby executing processing of each step shown in a flowchart in FIG. 21.

First, the control section 21 (the image data processing section 26) creates images of color patches of each chart in accordance with instructions to create a chart given from the job processing control section 25, transfers the images of color patches of each chart and layout information of the color patches to the RIP section 27, causes the RIP section 27 to create a print image of each chart, transmits the print image data of each chart to the image forming apparatus 30, and gives instructions to the image forming apparatus 30 to print the each chart and measure colors of the each chart (S501). The print section 35 of the image forming apparatus 30 prints each chart, and the scanning section 33 or the in-line sensor 36 measures colors of color patches of each chart. Successively, the control section 21 (the image data processing section 26) receives measured color data (RGB values) from the image forming apparatus 30, and stores the RGB values of color patches of each of the scanner profile chart and the main chart in the storage section 22 (S502).

Next, the control section 21 (the image data processing section 26) reads out the measured color data from the storage section 22, and rearranges color patches of each of the scanner profile chart and the main chart so as to make average RGB values calculated for subgroups of color patches all over the chart uniform (in other words, so as to restrict spread of average RGB values calculated for plural subgroups of color patches in the chart within a predetermined range) (S503). Since the technique to rearrange color patches is the same as that in the above-mentioned Example 1, description is omitted.

Next, the control section 21 (the image data processing section 26) calculates the value S1 about the average RGB values of subgroups of color patches (namely, the average values of the average RGB values of subgroups of color patches) all over the scanner profile chart including the rearranged color patches, and the value S2 about the average RGB values of subgroups of color patches all over the main chart, and stores the values S1 and S2 in the storage section 22 (S504).

Next, the control section 21 (the image data processing section 26) compares the value S1 with the value S2 (S505). In the case where the values S1 and S2 are not equivalent to each other (a difference between the values S1 and S2 exceeds a predetermined threshold), the control section 21 adds one or more dummy color patches which are not used as a color measurement target (used as only a marginal color patch) into the main chart so as to make the values S1 and S2 equivalent to each other (S506). For example, in the case where the value S2 is smaller than the value S1, in order to raise the average value of the average RGB values of subgroups of color patches in the main chart, the control section 21 adds dummy color patches 43 with relatively-large RGB values into the main chart. On the other hand, in the case where the value S2 is larger than the value S1, in order to lower the average value of the average RGB values of subgroups of color patches in the main chart, the control section 21 adds dummy color patches 43 with relatively-low RGB values in the main chart.

Next, after the control section 21 (the image data processing section 26) rearranges color patches of the main chart so as to make the average RGB values of subgroup of the color patches all over the main chart uniform (so as to restrict spread of the average RGB values within a predetermined range), the control section 21 stores the value S2 about the average RGB values of subgroups of color patches all over the main chart (S507). Successively, the control section 21 returns to S505, compares the value S1 with the value S2, and repeats processing at S506 and S507 until the values S1 and S2 become equivalent to each other (a difference between the values S1 and S2 become equal to or less than a threshold). When the values S1 and S2 become equivalent to each other, the control section 21 (the image data processing section 26) transfers the images of color patches and layout information of the rearranged color patches of the main chart to the RIP section 27, and the control section 21 (the RIP section 27) creates a print image of the main chart in which color patches are arranged in accordance with the layout information transferred from the image data processing section 26 (S508).

Subsequently, the control section 21 (image data processing section 26) transmits the print image data of the main chart to the image forming apparatus 30, and gives instructions to the image forming apparatus 30 to print the main chart and measure colors of the printed main chart. The print section 35 of the image forming apparatus 30 prints the main chart, and the scanning section 33 or the in-line sensor 36 measures colors of color patches of the main chart. Successively, the control section 21 (the image data processing section 26) receives the measured color data of the main chart from the image forming apparatus 30, and executes color calibration including renewal of the color conversion table.

In this way, at the time of creating the scanner profile chart and the main chart, the chart creation method includes arranging one or more dummy color patches which is not used as a color measurement target in the main chart so as to adjust the average RGB values of the main chart to the average RGB values of the scanner profile chart. Thereby, the color measurement accuracy of the main chart can be enhanced, and it becomes possible to suppress an increase of the number of defective paper sheets due to main charts which have been output many times.

Example 3

Figure 22:
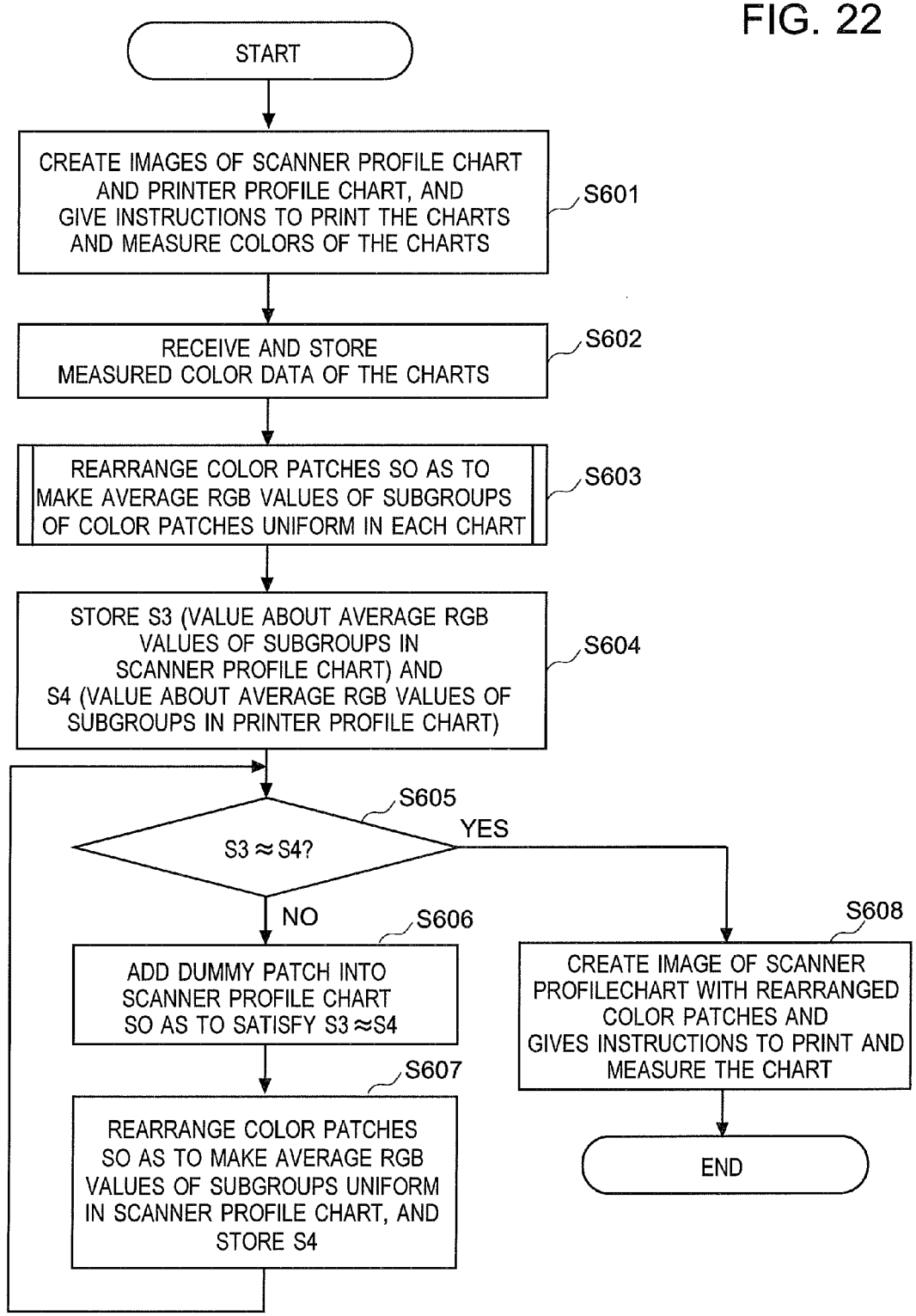
FIG. 22 is a flowchart illustrating an example of the operation of a printer controller pertaining to Example 3.
Figure 23A:
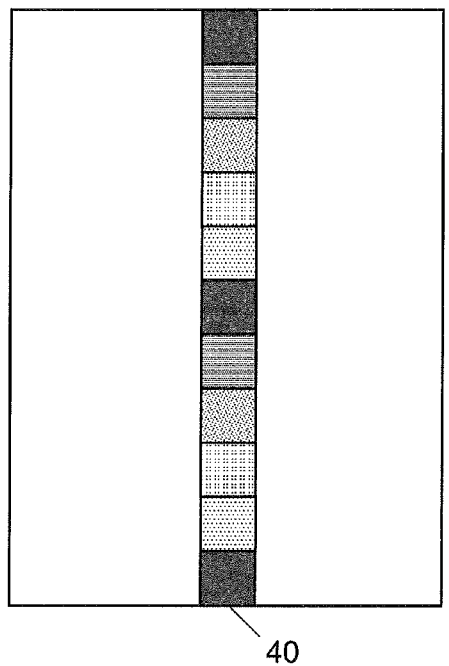
FIGS. 23A, 23B and 23C illustrate an example of a scanner profile chart pertaining to Example 3.
Figure 23B:
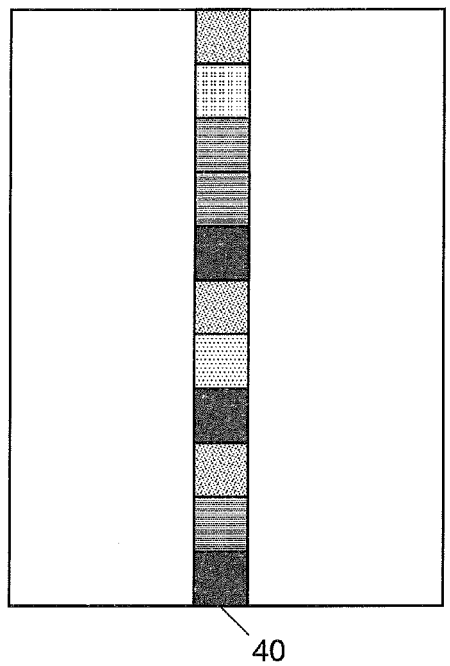
Figure 23C:
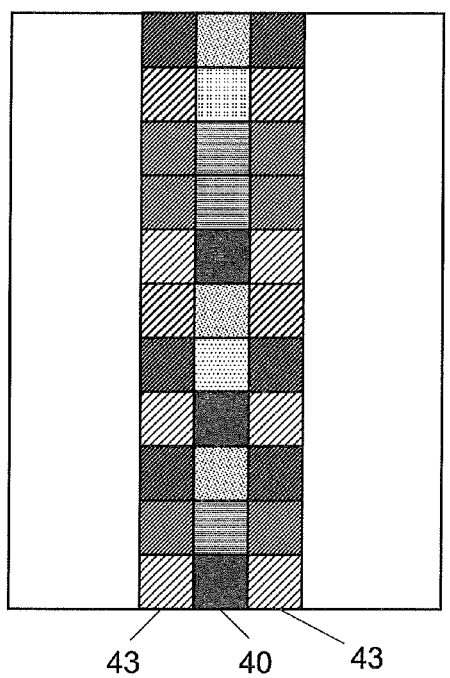

Next, description will be given to a chart creation control program, a control apparatus, and a chart creation method pertaining to Example 3 of the present invention with reference to FIG. 22 and FIGS. 23A to 23C. FIG. 22 is a flowchart illustrating an example of the operation of the printer controller, and FIGS. 23A to 23C are diagrams illustrating an example of a scanner profile chart.

In the above-mentioned Example 2, the influence of diffuse reflection of light on neighboring color patches of a target color patch is made to become equivalent for a scanner profile chart and an main chart. In the present example, the influence of diffuse reflection of light on neighboring color patches is made to become equivalent for a scanner profile chart and a printer profile chart (a chart for a printer profile) which is a chart to be used for color calibration of a print engine.

In that case, the constitution of each apparatus of a printing system is the same as that in the above-mentioned Example 1. However, the control section 21 (the image data processing section 26) of the printer controller 20 arranges one or more dummy color patches so as to make the average RGB values of all the subgroups of color patches throughout the scanner profile chart equivalent to the average RGB values of all the subgroups of color patches throughout the printer profile chart. At that time, since the number of color patches in the printer profile chart is large, it is difficult to add dummy color patches into the chart. However, as illustrated in FIG. 23A, in the scanner profile chart 51, color patches are arranged only in a predetermined single or plural lines, and there are a great area of margin where no color patches are arranged. Accordingly, the one or more dummy color patches are arranged in the scanner profile chart.

Hereinafter, description is given to an example of the operation of the printer controller 20 in the case of creating a scanner profile chart and a printer profile chart. The CPU 21a loads the chart creation control program stored in the ROM 21b or the storage section 22 onto the RAM 21c and executes the program, thereby executing processing of each step shown in a flowchart in FIG. 22.

First, the control section 21 (the image data processing section 26) creates images of color patches of each chart in accordance with instructions to create a chart given from the job processing control section 25, transfers the images of color patches of each chart and layout information of the color patches to the RIP section 27, causes the RIP section 27 to create a print image of each chart, transmits the print image data of each chart to the image forming apparatus 30, and gives instructions to the image forming apparatus 30 to print the each chart and measure colors of the each chart (S601). The print section 35 of the image forming apparatus 30 prints each chart, and the scanning section 33 or the in-line sensor 36 measures colors of color patches of each chart. Successively, the control section 21 (the image data processing section 26) receives measured color data (RGB values) from the image forming apparatus 30, and stores the RGB values of color patches of each of the scanner profile chart and the printer profile chart in the storage section 22 (S602).

Next, the control section 21 (the image data processing section 26) reads out the measured color data from the storage section 22, and rearranges color patches of each of the scanner profile chart and the printer profile chart so as to make average RGB values calculated for subgroups of color patches all over the chart uniform (in other words, so as to restrict spread of average RGB values calculated for plural subgroups of color patches in the chart within a predetermined range) (S603). FIG. 23B illustrates a state where the color patches of the scanner profile chart 51 are rearranged. Since the technique to rearrange color patches is the same as that in the above-mentioned Example 1, description is omitted.

Next, the control section 21 (the image data processing section 26) calculates the value S3 about the average RGB values of subgroups of color patches (namely, the average values of the average RGB values of subgroups of color patches) all over the scanner profile chart including the rearranged color patches, and the value S4 about the average RGB values of subgroups of color patches all over the printer profile chart, and stores the values S3 and S4 in the storage section 22 (S604).

Next, the control section 21 (the image data processing section 26) compares the value S3 with the value S4 (S605). In the case where the values S3 and S4 are not equivalent to each other (a difference between the values S3 and S4 exceeds a predetermined threshold), the control section 21 adds one or more dummy color patches which are not used as a color measurement target (used as only a marginal color patch) into the scanner profile chart so as to make the values S3 and S4 equivalent to each other (S606). FIG. 23C illustrates an example in a state where dummy color patches 43 are added in the vicinity of color patches 40 as targets of color measurement in the scanner profile chart. For example, in the case where the value S3 is smaller than the value S4, in order to raise the average value of the average RGB values of subgroups of color patches in the scanner profile chart, the control section 21 adds dummy color patches 43 with relatively-large RGB values into the scanner profile chart. On the other hand, in the case where the value S3 is larger than the value S4, in order to lower the average value of the average RGB values of subgroups of color patches in the scanner profile chart, the control section 21 adds dummy color patches 43 with relatively-low RGB values in the scanner profile chart.

Next, after the control section 21 (the image data processing section 26) rearranges color patches of the scanner profile chart so as to make the average RGB values of subgroup of the color patches all over the scanner profile chart uniform (so as to restrict spread of the average RGB values within a predetermined range), the control section 21 stores the value S4 about the average RGB values of subgroups of color patches all over the scanner profile chart (S607). Successively, the control section 21 returns to S605, compares the value S3 with the value S4, and repeats processing at S606 and S607 until the values S3 and S4 become equivalent to each other (a difference between the values S3 and S4 become equal to or less than a threshold). When the values S3 and S4 become equivalent to each other, the control section 21 (the image data processing section 26) transfers the images of color patches and layout information of the rearranged color patches of the scanner profile chart to the RIP section 27, and the control section 21 (the RIP section 27) creates a print image of the scanner profile chart in which color patches are arranged in accordance with the layout information transferred from the image data processing section 26 (S608).

Subsequently, the control section 21 (image data processing section 26) transmits the print image data of the scanner profile chart to the image forming apparatus 30, and gives instructions to the image forming apparatus 30 to print the scanner profile chart and measure colors of the printed scanner profile chart. The print section 35 of the image forming apparatus 30 prints the scanner profile chart, and the scanning section 33 or the in-line sensor 36 measures colors of color patches of the scanner profile chart. Successively, the control section 21 (the image data processing section 26) receives the measured color data of the scanner profile chart from the image forming apparatus 30, and executes color calibration including renewal of the color conversion table.

In this way, at the time of creating the scanner profile chart and the printer profile chart, arranging dummy color patches which is not used as a color measurement target in the scanner profile chart does not increase the number of paper sheet due to the reason of the structure of the scanner profile chart. Therefore, the chart creation method includes arranging one or more dummy color patches in the scanner profile chart so as to adjust the average RGB values of the main chart to the average RGB values of the printer profile chart. Thereby, the color measurement accuracy of the scanner profile chart can be enhanced.

Example 4

Figure 24:
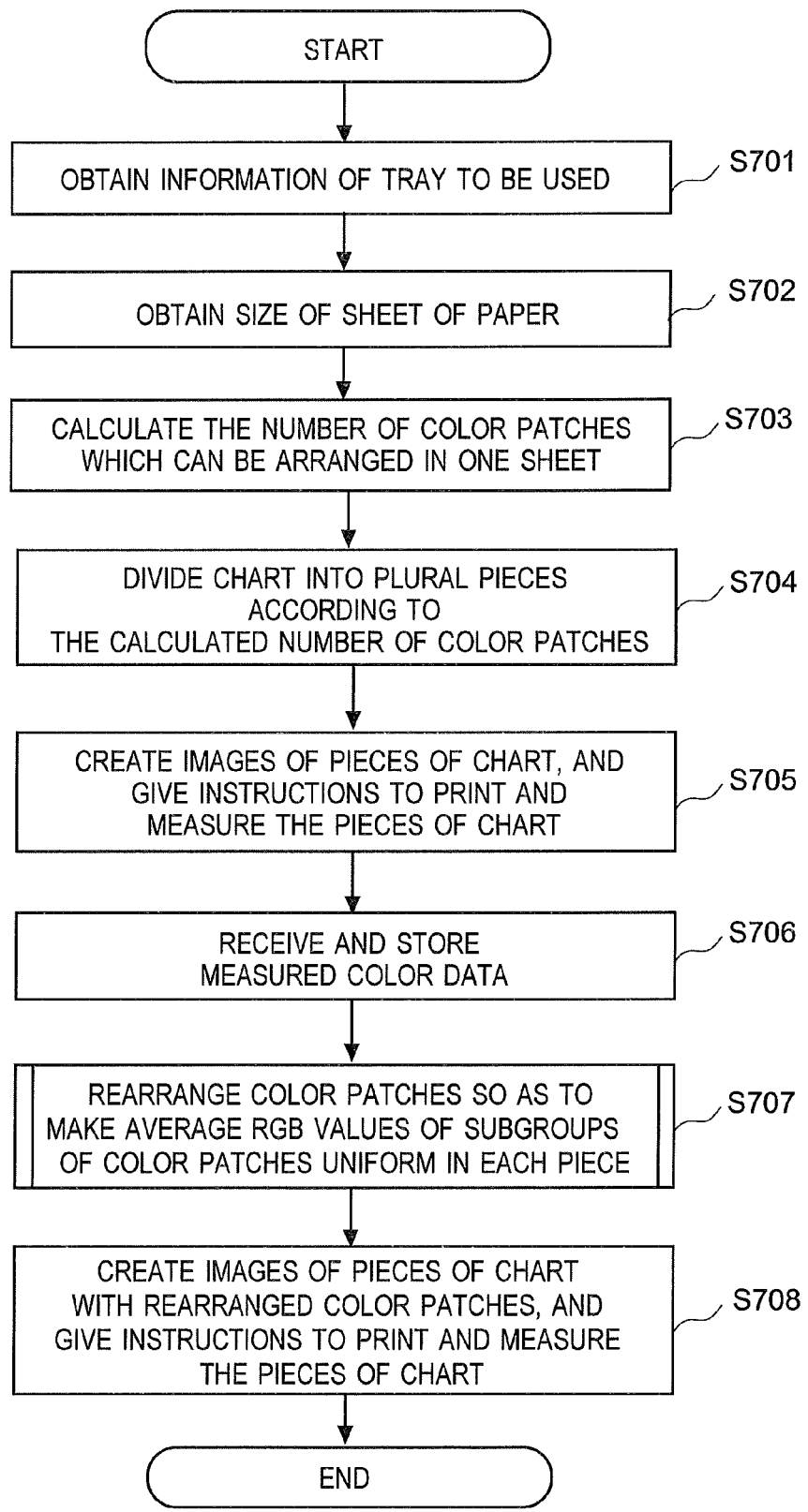
FIG. 24 is a flowchart illustrating an example of the operation of a printer controller pertaining to Example 4.

Next, description will be given to a chart creation control program, a control apparatus, and a chart creation method pertaining to Example 1 of the present invention with reference to FIG. 24 and FIGS. 25A to 25D. FIG. 24 is a flowchart illustrating an example of the operation of the printer controller, and FIGS. 25A to 25D are diagrams illustrating a specific example of a chart to be used for color calibration.

In the above-mentioned Examples 1 to 3, the description is given to a case where a chart is incorporated in a single sheet. In the present example, description is given to a case where a chart is formed over plural sheets of paper.

In that case, the constitution of each apparatus of a printing system is the same as that in the above-mentioned Example 1. However, the control section 21 (the image data processing section 26) obtains tray information to be used from the image forming apparatus 30, obtains the size of a sheet of paper stored in the tray, and calculates the number of color patches which can be arranged on a single sheet of the paper. Then, the control section 21 divides a chart into plural pieces in accordance with the calculated number of color patches, and rearranges color patches in the pieces of the chart so as to make the average RGB values of all the subgroups of color patches uniform in each of the pieces of the chart.

Hereinafter, description is given to an example of operation of the printer controller 20 in the case of creating divided pieces of a chart. The CPU 21*a* loads the chart creation control program stored in the ROM 21*b* or the storage section 22 onto the RAM 21*c* and executes the program, thereby executing processing of each step shown in a flowchart in FIG. 24.

First, the control section 21 (the image data processing section 26) obtains tray information to be used for printing a chart from the image forming apparatus 30 (S701), and obtains the size of sheets of paper stored in the paper sheet tray (S702). Next, based on the paper sheet size, the control section 21 (the image data processing section 26) calculates the number of color patches which can be arranged in one sheet of the paper (S703), and divides a chart into plural divided pieces in accordance with the number of color patches which can be arranged in a single sheet of paper (S704).

Then, the control section 21 (the image data processing section 26) transfers the images of color patches to be arranged on each piece of the chart and layout information of the color patches to the RIP section 27, causes the RIP section 27 to create a print image of each pieces of the chart, transmits the print image data of each pieces of the chart to the image forming apparatus 30, and gives instructions to the image forming apparatus 30 to print the each pieces of the chart and measure colors of the each pieces of the chart (S705). The print section 35 of the image forming apparatus 30 prints each pieces of the chart, and the scanning section 33 or the in-line sensor 36 measures colors of color patches of each pieces of the chart. Successively, the control section 21 (the image data processing section 26) receives measured color data (RGB values) from the image forming apparatus 30, and stores the RGB values of each pieces of the chart in the storage section 22 (S706).

Figure 25A:
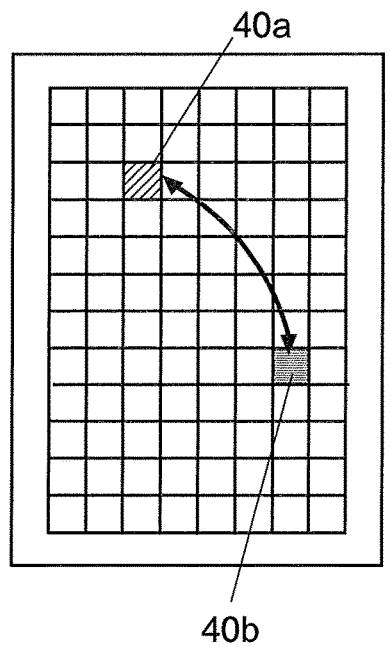
FIGS. 25A, 25B, 25C and 25D are diagrams illustrating an example of calculation of average RGB values pertaining to Example 4.
Figure 25B:
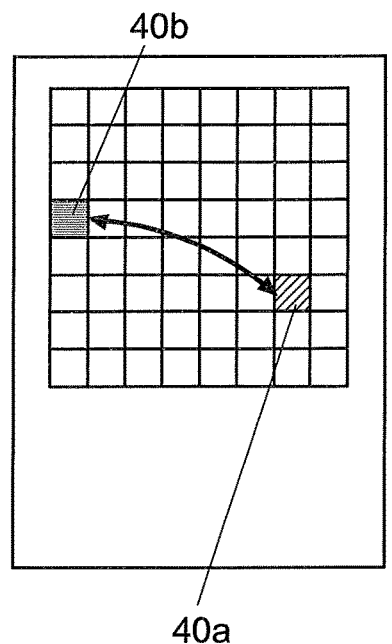
Figure 25C:
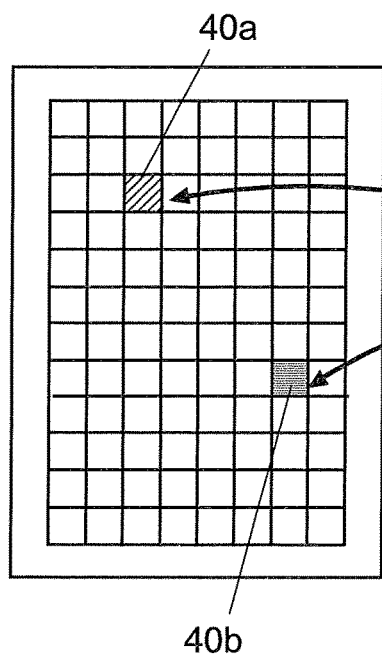
Figure 25D:
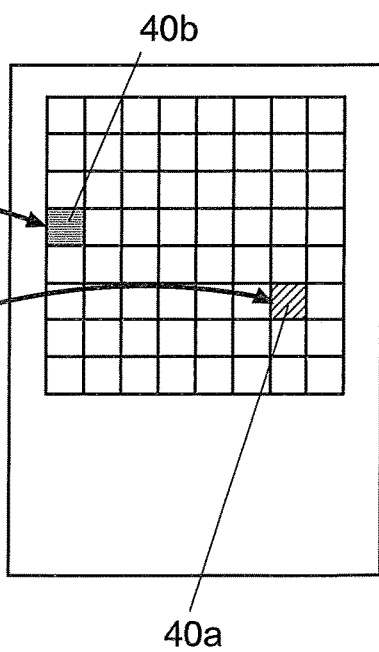

Next, the control section 21 (the image data processing section 26) reads out the measured color data from the storage section 22, and rearranges color patches of each pieces of the chart so as to make average RGB values calculated for subgroups of color patches all over the piece of the chart uniform (in other words, so as to restrict spread of average RGB values calculated for plural subgroups of color patches in the piece of the chart within a predetermined range) (S707). The rearrangement of color patches is described with reference to FIGS. 25A to 25D. Each of FIGS. 25A and 25C shows the first page of divided pieces of a chart, and each of FIGS. 25B and 25D shows the second page of the divided pieces of the chart. The rearrangement of color patches may include, as illustrated in FIGS. 25A and 25B, exchanging the positions between the first patch 40*a* and the second patch 40*b* within each of the divided pieces of the chart. Alternatively, the rearrangement of color patches may include, as illustrated in FIGS. 25C and 25D, exchanging the positions between the first patch 40*a* and the second patch 40*b* across the divided pieces of the chart, or exchanging the positions between the color patches by using a mixture of the technique shown in FIGS. 25A and 25B and the technique shown in FIGS. 25C and 25D. Since the technique to rearrange color patches is the same as that in the above-mentioned Example 1, description is omitted.

Next, the control section 21 (the image data processing section 26) transfers the images of the color patches of each of the divided pieces of the chart and the layout information of the rearranged color patches of each of the divided pieces of the chart to the RIP section 27, the control section 21 (the RIP section 27) creates the print images of the divided pieces of the chart in each of which color patches are arranged in accordance with the layout information transmitted from the image data processing section 26 (S805).

Subsequently, the control section 21 (the image data processing section 26) transmits the print image data of the divided pieces of the chart to the image forming apparatus 30, and gives instructions to the image forming apparatus 30 to print the divided pieces of the chart and measure colors of the printed pieces of the chart. The print section 35 of the image forming apparatus 30 prints the divided pieces of the chart, and the scanning section 33 or the in-line sensor 36 measures colors of color patches of the divided pieces of the chart. Successively, the control section 21 (the image data processing section 26) receives the measured color data of the divided pieces of the chart from the image forming apparatus 30, and executes color calibration including renewal of the color conversion table.

In this way, at the time of creating a chart, the chart may be divided into plural divided pieces in accordance with a paper sheet size, and color patches may be rearranged so as to make the average RGB values become equivalent to each other in the divided pieces of the chart. Thereby, a user can create a chart with an arbitrary paper sheet, and even in the case where a chart is printed on a paper sheet with any one of paper sheet sizes, the color measurement accuracy of a chart can be enhanced.

Example 5

Figure 26:
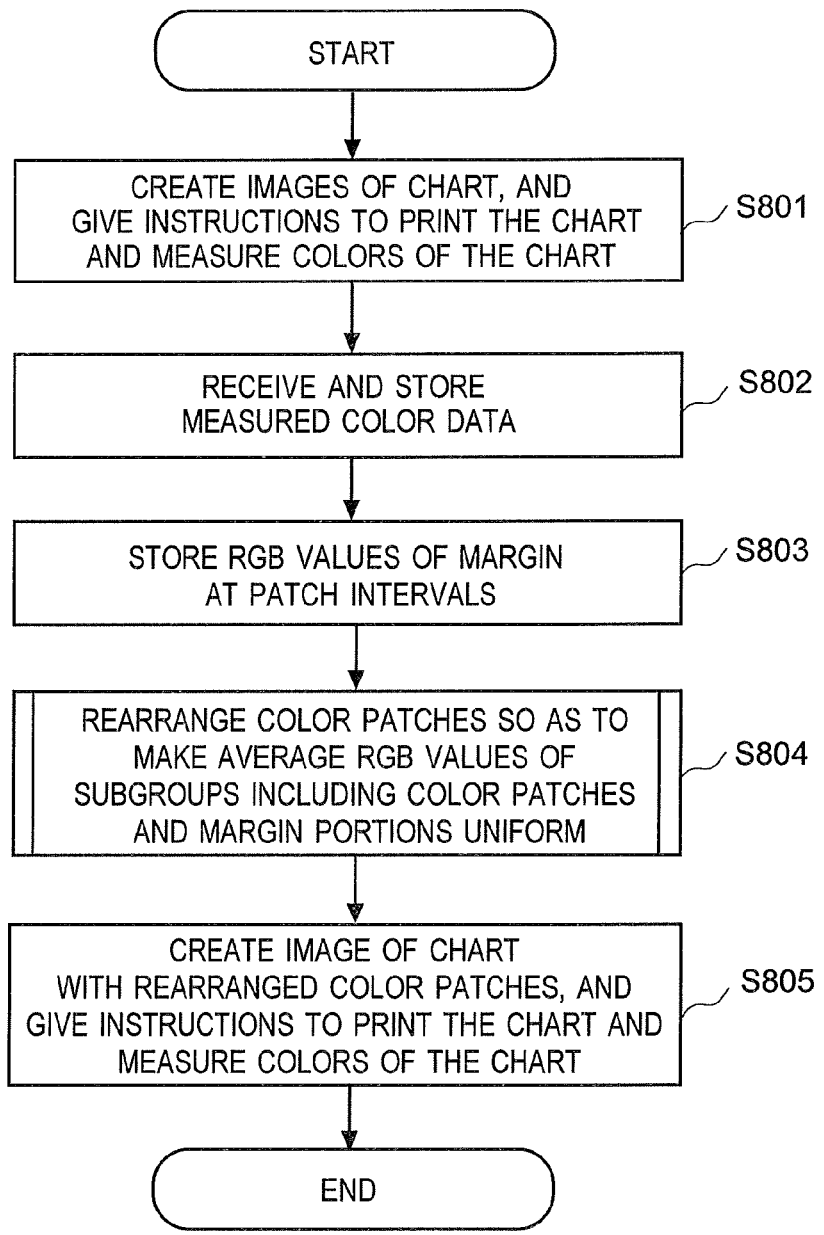
FIG. 26 is a flowchart illustrating an example of the operation of a printer controller pertaining to Example 5.
Figure 27C:
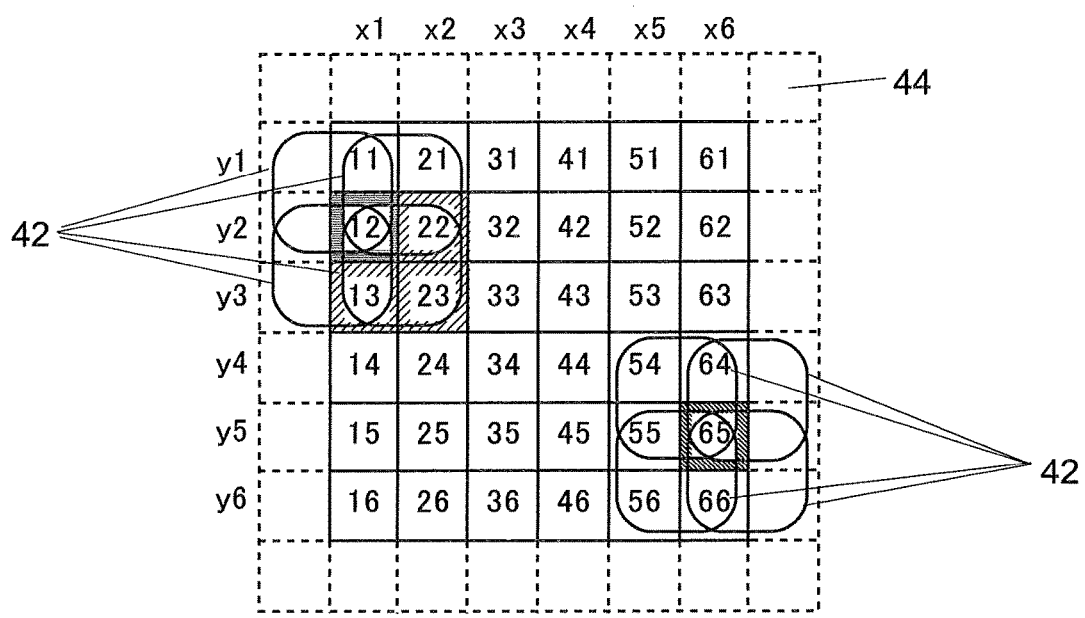

Next, description will be given to a chart creation control program, a control apparatus, and a chart creation method pertaining to Example 5 with reference to FIG. 26 and FIGS. 27A to 27C. FIG. 26 is a flowchart illustrating an example of the operation of the printer controller, and FIGS. 27A to 27C are schematic diagrams illustrating a calculation procedure of average RGB values.

In the above-mentioned Examples 1 to 4, a subgroup of color patches which is used for calculating an average RGB value is created out of a color patch to be measured (a target of color measurement or a target color patch) and at least one neighboring color patch located adjacent to the target color patch. In the present example, in the case where a target color is located on a periphery of the chart (in concrete terms, on a periphery of the area of the of color patches in the chart, color patches are rearranged in consideration of the influence of diffuse reflection of light on a margin of the chart.

In that case, the constitution of each apparatus of a printing system is the same as that in the above-mentioned Example 1. However, the control section 21 (the image data processing section 26) of the printer controller 20 rearranges color patches so as to equivalent the average RGB values each of which is calculated by using the RGB values of color patches forming the subgroup and the measured color values of the margin located on a periphery of the chart and surrounds the color patches of the chart.

Hereinafter, description is given to an example of operation of the printer controller 20. The CPU 21*a* loads the chart creation control program stored in the ROM 21*b* or the storage section 22 onto the RAM 21*c* and executes the program, thereby executing processing of each step shown in a flowchart of FIG. 26.

First, the control section 21 (the image data processing section 26) creates images of color patches of a chart in accordance with instructions to create a chart given from the job processing control section 25, transfers the images of color patches of the chart and layout information of the color patches to the RIP section 27, causes the RIP section 27 to create a print image of the chart, transmits the print image data of the chart to the image forming apparatus 30, and gives instructions to the image forming apparatus 30 to print the chart and measure colors of the each chart (S801). The print section 35 of the image forming apparatus 30 prints the chart, and the scanning section 33 or the in-line sensor 36 measures colors of color patches and the margin of the chart. Successively, the control section 21 (the image data processing section 26) receives measured color data (RGB values) from the image forming apparatus 30, stores the RGB values of the chart for color calibration in the storage section 22 (S802), and also stores the RGB values of the margin at the color patch intervals in the storage section 22 (S803).

Next, the control section 21 (the image data processing section 26) reads out the measured color data from the storage section 22, and rearranges color patches of the chart so as to make average RGB values calculated for subgroups of color patches all over the chart uniform (in other words, so as to restrict spread of average RGB values calculated for plural subgroups of color patches in the chart within a predetermined range) (S804). At that time, in the case of exchanging the RGB values and the positions between one color patch is located on a periphery of the color patch (that is, an edge part of an area of the of color patches in the chart) and another color patch, the average RGB value is calculated in consideration of the RGB values of the margin neighboring the color patch on the periphery. For example, as shown in FIGS. 27A and 27B, at the time of exchanging the RGB values between color patches (color patches at the coordinate positions of "12" and "65") located on the peripheral of the chart, as shown in FIG. 27C, the average RGB values of the subgroups 42 are calculated by using the margin portions 44 at the left, the upper left and the lower left of the color patch at the coordinate position of "12" to create the subgroups 42, and also average RGB values of the subgroups 42 are calculated by using the margin portions 44 at the right, the upper right, and the lower right of the color patch at the coordinate position of "65" to create the subgroups 42.

Next, the control section 21 (the image data processing section 26) transfers the images of color patches and layout information of the rearranged color patches of the scanner profile chart to the RIP section 27, and the control section 21 (the RIP section 27) creates a print image of the scanner profile chart in which color patches are arranged in accordance with the layout information transferred from the image data processing section 26 (S805).

Subsequently, the control section 21 (image data processing section 26) transmits the print image data of the chart to the image forming apparatus 30, and gives instructions to the image forming apparatus 30 to print the chart and measure colors of the chart. The print section 35 of the image forming apparatus 30 prints the chart, and the scanning section 33 or the in-line sensor 36 measures colors of color patches of the chart. Successively, the control section 21 (the image data processing section 26) receives the measured color data of the chart from the image forming apparatus 30, and executes color calibration including renewal of the color conversion table.

In this way, average RGB values are calculated in consideration of also the diffused reflection of light on the margin located on a periphery of the chart. Thereby, even in the case of using a paper sheet with any color, color measurement with high accuracy can be executed.

The present invention should not be limited to the above examples, and the constitution and control of the printing system and each apparatus can be modified appropriately unless such modification deviates from the intention of the present invention.

For example, in each of the above-mentioned examples, color patches to be exchanged are defined by using a standard deviation and a difference of the average RGB values of subgroups of color patches. However, as long as a spread of the average RGB values of subgroups of color patches in a chart can be made small by exchanging the positions between color patches, a technique of exchange or rearrangement of color patches and a selection of an index representing the spread of average RGB values of subgroups of color patches in a chart may be changed appropriately.

Further, in the above examples, the in-line sensor 36 is constituted to be disposed on a paper sheet conveying path between the fixing section of the print section 35 and a sheet delivery tray in the image forming apparatus 30. However, the in-line sensor 36 may also be disposed near the intermediate transfer belt 352. In that case, the in-line sensor 36 can measure color of color patches of a chart the image of which was formed on the intermediate transfer belt 352, to output measured color data.

The present invention can be used for a chart creation control program to control creation of a chart, a non-transitory computer-recording storage medium which stores the chart creation control program, a control apparatus which creates the chart, and a chart creation method in a system including an image forming apparatus and the control apparatus.

The invention claimed is:

1. A chart creation method to be used in a system including an image forming apparatus and a control apparatus which controls the image forming apparatus, the image forming apparatus including a print section and a color measurement section, the method comprising:
   first creating a chart, including
      creating, by the control apparatus, a print image of a chart in which a plurality of color patches are arranged,
      giving, from the control apparatus, instructions to the image forming apparatus to print the chart and measure colors of the chart, and
      printing the chart and measuring colors of the chart by the image forming apparatus;
   performing rearrangement of the plurality of color patches of the chart by the control apparatus, the rearrangement including
      obtaining measured color values of the plurality of color patches of the chart from the image forming apparatus, and
      rearranging the plurality of color patches of the chart so as to restrict spread of average color values calculated for subgroups of color patches in the chart within a predetermined range, by calculating the average color values for the subgroups of the color patches in the chart while successively exchanging the measured color values between a pair of the color patches in the chart, the subgroups each consisting of one color patch and at least one neighboring color patch of the one color patch out of the plurality of color patches of the chart, the average color values each being an average of measured color values of color patches forming one of the subgroups; and second creating a chart with the rearranged color patches, includes
creating, by the control apparatus, a print image of a chart including the rearranged color patches,
giving, from the control apparatus, instructions to the image forming apparatus to print the chart including the rearranged color patches and measure colors of the chart, and
printing the chart including the rearranged color patches and measuring colors of the chart by the image forming apparatus.

2. The chart creation method of claim 1,
wherein the rearranging the plurality of color patches, includes
selecting a first patch and a second patch from the plurality of color patches of the chart,
successively selecting color patches as exchange patches from a subgroup of color patches consisting of the first patch and at least one neighboring color patch of the first patch out of the plurality of color patches of the chart,
exchanging the measured color values between one of the exchange patches and the second patch,
calculating the average color values for first subgroups of color patches and the average color values for second subgroups of color patches, the first subgroups each consisting of the one of the exchange patches and at least one neighboring color patch of the one of the exchange patches out of the plurality of color patches of the chart, the second subgroups each consisting of the second patch and at least one neighboring color patch of the second patch out of the plurality of color patches of the chart,
calculating an index indicating spread of the average color values calculated for the first subgroups and the second subgroups, for each of the exchange patches,
defining the pair of color patches to be exchanged on a basis of the indexes calculated for the exchange patches, and
exchanging positions between the pair of color patches.

3. The chart creation method of claim 2,
wherein the selecting the first patch and the second patch, includes
selecting one of the first patch and the second patch or both of the first patch and the second patch at random from the plurality of color patches of the chart.

4. The chart creation method of claim 3,
wherein the calculating the index, includes
calculating a standard deviation of the average color values calculated for the first subgroups and the second subgroups, for each of the exchange patches, and
the defining the pair of color patches to be exchanged, includes
finding a smallest standard deviation among the standard deviations calculated for the exchange patches, and
defining a pair of one of the exchange patches and the second patch which were selected when obtaining the smallest standard deviation, as the pair of color patches to be exchanged.

5. The chart creation method of claim 3,
wherein the performing the rearrangement, includes
repeating the rearranging the plurality of color patches of the chart until a standard deviation of the average color values calculated for the subgroups all over the chart becomes equal to or less than a predetermined value.

6. The chart creation method of claim 3,
wherein the performing the rearrangement, includes
repeating the rearranging the plurality of color patches of the chart until a number of repeats of the rearranging reaches a predetermined number of times.

7. The chart creation method of claim 1,
wherein the first creating a chart, the performing the rearrangement and the second creating a chart are performed on each of two charts relating to each other, and
the performing the rearrangement, includes,
on a difference between an average of the average color values calculated for the subgroups all over one of the charts and an average of the average color values calculated for the subgroups all over the other of the charts, exceeding a predetermined threshold value, adding one or more dummy color patches into one of the two charts so as to reduce the difference not to be greater than the predetermined threshold.

8. The chart creation method of claim 7,
wherein the two chart are a chart to be used for color calibration of the print section and a chart to be used for color calibration of the color measurement section, and
the one or more dummy color patches are added into the chart to be used for color calibration of the color measurement section.

9. The chart creation method of claim 1,
wherein the performing the rearrangement, includes,
obtaining a size of a sheet of paper to be used for creating a chart, from the image forming apparatus,
calculating a number of color patches which can be arranged within a sheet of paper of the size obtained,
dividing the chart into a plurality of pieces in accordance with the number of color patches, and
performing the rearranging the plurality of color patches on each of the pieces of the chart.

10. The chart creation method of claim 1,
wherein the performing the rearrangement, includes,
obtaining the measured color values of a margin located on a periphery of the chart, and
for the subgroup in which the one color patch is located on a periphery of an area of the plurality of color patches and a number of the at least neighboring color patch is less than that of other subgroups, calculating the average color value by using the measured color values of color patches forming the subgroups and the measured color values of the margin.

11. A control apparatus which controls an image forming apparatus including a print section and a color measurement section, the control apparatus comprising:
a RIP (raster image processing) section that creates a print image of a chart in which a plurality of color patches are arranged; and
an image data processing section configured to:
give instructions to the image forming apparatus to print the chart and measure colors of the chart, on a basis of the print image created by the RIP section,
obtain measured color values of the plurality of color patches of the chart from the image forming apparatus, and
rearrange the plurality of color patches of the chart so as to restrict spread of average color values calculated for subgroups of color patches in the chart within a predetermined range, by calculating the average color values for the subgroups of the color patches in the chart while successively exchanging the measured color values between a pair of the color patches in the chart, the subgroups each consisting of one color patch and at least one neighboring color patch of the one color patch out of the plurality of color patches of the chart, the average color values each being an average of measured color values of color patches forming one of the subgroups.

12. The control apparatus of claim 11,
wherein, on rearranging the plurality of color patches, the image data processing section performs processes including,
selecting a first patch and a second patch from the plurality of color patches of the chart,
successively selecting color patches as exchange patches from a subgroup of color patches consisting of the first patch and at least one neighboring color patch of the first patch out of the plurality of color patches of the chart,
exchanging the measured color values between one of the exchange patches and the second patch,
calculating the average color values for first subgroups of color patches and the average color values for second subgroups of color patches, the first subgroups each consisting of the one of the exchange patches and at least one neighboring color patch of the one of the exchange patches out of the plurality of color patches of the chart, the second subgroups each consisting of the second patch and at least one neighboring color patch of the second patch out of the plurality of color patches of the chart,
calculating an index indicating spread of the average color values calculated for the first subgroups and the second subgroups, for each of the exchange patches,
defining the pair of color patches to be exchanged on a basis of the indexes calculated for the exchange patches, and
exchanging positions between the pair of color patches.

13. The control apparatus of claim 12,
wherein, on selecting the first color patch and the second color patch, the image data processing section selects one of the first patch and the second patch or both of the first patch and the second patch at random from the plurality of color patches of the chart.

14. The control apparatus of claim 13,
wherein, on calculating the index, the image data processing section calculates a standard deviation of the average color values calculated for the first subgroups and the second subgroups, for each of the exchange patches, and
on defining the pair of color patches to be exchanged, the image data processing section finds a smallest standard deviation among the standard deviations calculated for the exchange patches, and defines a pair of one of the exchange patches and the second patch which were selected when obtaining the smallest standard deviation, as the pair of color patches to be exchanged.

15. The control apparatus of claim 13,
wherein the image data processing section repeats the rearranging the plurality of color patches of the chart until a standard deviation of the average color values calculated for the subgroups all over the chart becomes equal to or less than a predetermined value.

16. The control apparatus of claim 13,
wherein the image data processing section repeats the rearranging the plurality of color patches of the chart until a number of repeats of the rearranging reaches a predetermined number of times.

17. The control apparatus of claim 11,
wherein the RIP section that creates a print image of each of two charts relating to each other, and
on a difference between an average of the average color values calculated for the subgroups all over one of the charts and an average of the average color values calculated for the subgroups all over the other of the charts, exceeding a predetermined threshold value, the image data processing section adds one or more dummy color patches into one of the two charts so as to reduce the difference not to be greater than the predetermined threshold.

18. The control apparatus of claim 17,
wherein the two chart are a chart to be used for color calibration of the print section and a chart to be used for color calibration of the color measurement section, and
the one or more dummy color patches are added into the chart to be used for color calibration of the color measurement section.

19. The control apparatus of claim 11,
wherein the image data processing section
obtains a size of a sheet of paper to be used for creating a chart, from the image forming apparatus,
calculates a number of color patches which can be arranged within a sheet of paper of the size obtained,
divides the chart into a plurality of pieces in accordance with the number of color patches, and
performs the rearranging the plurality of color patches on each of the pieces of the chart.

20. The control apparatus of claim 11,
wherein the image data processing section
obtains the measured color values of a margin located on a periphery of the chart, and
for the subgroup in which the one color patch is located on a periphery of an area of the plurality of color patches and a number of the at least neighboring color patch is less than that of other subgroups, calculates the average color value by using the measured color values of color patches forming the subgroups and the measured color values of the margin.

21. A non-transitory computer-readable storage medium storing a chart creation control program to be executed in a control apparatus which controls an image forming apparatus including a print section and a color measurement section, the chart creation control program, when being executed by a processor of the control apparatus, causing the control apparatus to perform processing comprising:
first creating a chart, including
creating a print image of a chart in which a plurality of color patches are arranged, and
giving instructions to the image forming apparatus to print the chart and measure colors of the chart;
performing rearrangement of the plurality of color patches of the chart, the rearrangement including
obtaining measured color values of the plurality of color patches of the chart from the image forming apparatus, and
rearranging the plurality of color patches of the chart so as to restrict spread of average color values calculated for subgroups of color patches in the chart within a predetermined range, by calculating the average color values for the subgroups of the color patches in the chart while successively exchanging the measured color values between a pair of the color patches in the chart, the subgroups each consisting of one color patch and at least one neighboring color patch of the one color patch out of the plurality of color patches of the chart, the average color values each being an average of measured color values of color patches forming one of the subgroups; and
second creating a chart with the rearranged color patches, includes
  creating a print image of a chart including the rearranged color patches, and
  giving instructions to the image forming apparatus to print the chart including the rearranged color patches and measure colors of the chart.

* * * * *